United States Patent
Lee et al.

(10) Patent No.: US 10,345,947 B2
(45) Date of Patent: Jul. 9, 2019

(54) APPARATUS AND METHOD FOR DETECTING HOVERING OBJECT, SWITCHING MATRIX, APPARATUS FOR DETERMINING COMPENSATION CAPACITANCE, METHOD OF COMPENSATING FOR FORCE SENSING CAPACITANCE, AND APPARATUS FOR DETECTING FORCE INPUT

(71) Applicants: MELFAS INC., Seongnam-si, Gyeonggi-do (KR); NPLANIC CO., LTD., Seoul (KR)

(72) Inventors: Seung Wook Lee, Seoul (KR); Byung Sang Rhim, Yongin-si (KR); Jeong Woo Lee, Seoul (KR)

(73) Assignees: MELFAS INC., Seongnam-si, Gyeonggi-Do (KR); NPLANIC CO., LTD., Seoul (KR)

( * ) Notice: Subject to any disclaimer, the term of this patent is extended or adjusted under 35 U.S.C. 154(b) by 479 days.

(21) Appl. No.: 15/159,308

(22) Filed: May 19, 2016

(65) Prior Publication Data
US 2016/0349906 A1     Dec. 1, 2016

(30) Foreign Application Priority Data

May 27, 2015   (KR) .................. 10-2015-0074139
Dec. 22, 2015  (KR) .................. 10-2015-0183662

(51) Int. Cl.
  *G06F 3/044*   (2006.01)
  *G06F 3/041*   (2006.01)
  *G01L 1/14*    (2006.01)

(52) U.S. Cl.
  CPC .............. *G06F 3/0416* (2013.01); *G01L 1/14* (2013.01); *G06F 3/044* (2013.01); *G06F 3/0414* (2013.01);

(Continued)

(58) Field of Classification Search
None
See application file for complete search history.

(56) References Cited

U.S. PATENT DOCUMENTS

2011/0007021 A1   1/2011   Bernstein et al.
2012/0050180 A1   3/2012   King et al.
(Continued)

FOREIGN PATENT DOCUMENTS

| CN | 102483673 A | 5/2012 |
| CN | 103154866 A | 6/2013 |
| CN | 103440073 A | 12/2013 |

OTHER PUBLICATIONS

Chinese Office Action for related CN application No. 201610357319.9 dated Jul. 26, 2018 from Chinese Patent Office.

*Primary Examiner* — Carl Adams
(74) *Attorney, Agent, or Firm* — Paratus Law Group, PLLC

(57) ABSTRACT

Disclosed is a method of detecting a hovering object, the method including: an operation of precharging a compensation capacitor and a parallel capacitor, which is obtained by connecting in parallel a self-capacitor formed between an object hovering over a touch panel and an electrode of the touch panel and a parasitic capacitor of the touch panel, with a predetermined voltage; a first charge sharing operation of sharing charges by connecting the parallel capacitor and the compensation capacitor in series; a second charge sharing operation of sharing charges by connecting the parallel capacitor and the compensation capacitor in parallel; and an operation of outputting an electrical signal provided by the parallel capacitor while the parallel capacitor and the compensation capacitor are connected in parallel.

46 Claims, 16 Drawing Sheets

(52) U.S. Cl.
CPC .............. *G06F 2203/04101* (2013.01); *G06F 2203/04105* (2013.01)

(56) References Cited

U.S. PATENT DOCUMENTS

| | | |
|---|---|---|
| 2012/0050211 A1 | 3/2012 | King et al. |
| 2013/0307812 A1* | 11/2013 | Hanssen ................. G06F 3/044 345/174 |
| 2014/0104223 A1* | 4/2014 | Hanssen ................. G06F 3/044 345/174 |
| 2016/0011707 A1* | 1/2016 | Yang ..................... G06F 3/0414 345/173 |

\* cited by examiner

Fig. 7
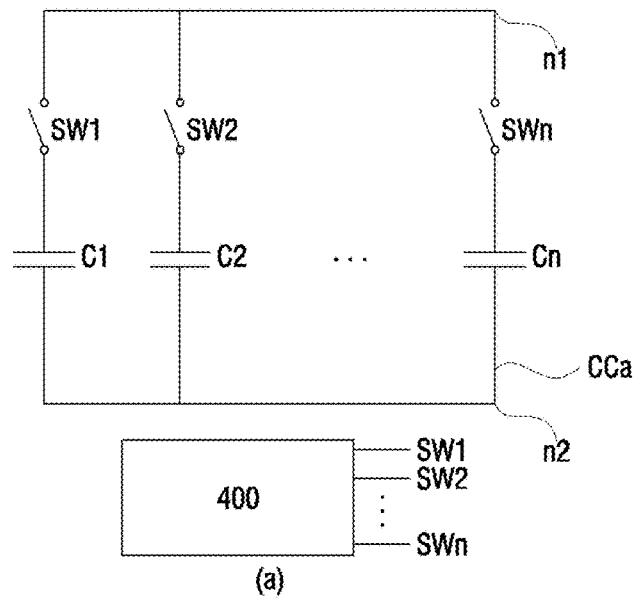
(a)
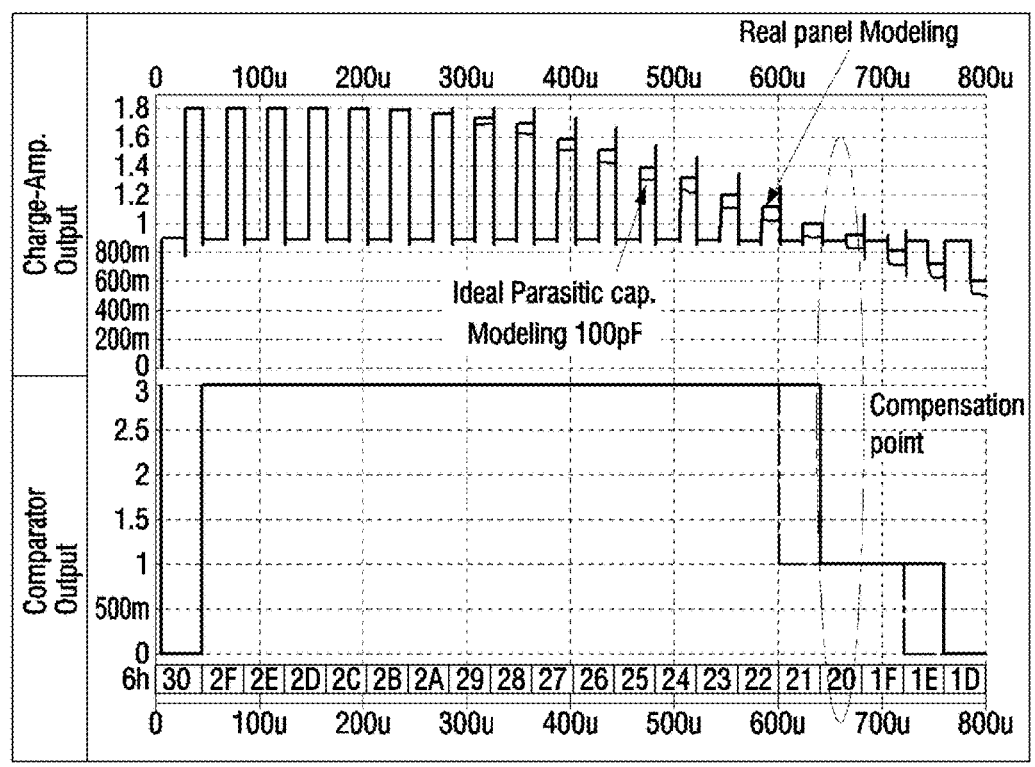
(b)

APPARATUS AND METHOD FOR DETECTING HOVERING OBJECT, SWITCHING MATRIX, APPARATUS FOR DETERMINING COMPENSATION CAPACITANCE, METHOD OF COMPENSATING FOR FORCE SENSING CAPACITANCE, AND APPARATUS FOR DETECTING FORCE INPUT

CROSS-REFERENCE TO RELATED APPLICATION

This application claims priority to Korean Patent Applications No. 10-2015-0074139, filed on May 27, 2015 and No. 10-2015-0183662, filed on Dec. 22, 2015, the disclosure of which are incorporated herein by reference in their entirety.

BACKGROUND

The present invention relates to an apparatus and method for detecting a hovering object using inherently intrinsic capacitance compensation, and an apparatus and method for detecting a force input using inherently intrinsic capacitance compensation.

Object sensing methods currently used in touch screens mainly include a resistive type, a surface acoustic wave type, and a capacitive type. Capacitive touch screens can sense multiple touches, have excellent durability, visibility, etc., and thus are being employed as main input means of portable devices.

A capacitive touch screen recognizes a user input by sensing a change in the quantity of electric charge in capacitive sensors on a touch screen panel caused by a user intervention. According to charge accumulation methods, capacitive touch screens are classified into a self-capacitive type and a mutual-capacitive type. In a self-capacitance touch screen, each capacitive sensor constitutes one conductor and forms an electric charge surface together with a reference ground outside the touch screen panel, but in a mutual-capacitance touch screen, two conductors on the touch screen panel mutually form an electric charge surface and function as one capacitive sensor.

A general self-capacitance touch screen uses an X-Y orthogonal arrangement of conductors. In this case, each capacitive sensor functions as a line sensor, and thus only one piece of X-sensing information and one piece of Y-sensing information are respectively provided by an X-line sensor group and a Y-line sensor group every time the touch screen is scanned. Therefore, the general self-capacitance touch screen can sense and track a single touch but cannot support multiple touches. A mutual-capacitance touch screen also uses an X-Y orthogonal arrangement of conductors. However, the mutual-capacitance touch screen differs from the self-capacitance touch sensor in that capacitive sensors are each placed at intersections of conductors in the form of grid sensors, and responses of all grid sensors are independently sensed when a user input on the touch screen is detected. Since grid sensors each correspond to different X-Y coordinates and provide independent responses, the mutual-capacitance touch screen can sense and track multiple touches of a user by extracting user input information from a set of X-Y sensing information provided by a set of X-Y grid sensors.

A general mutual-capacitance touch screen panel has the following configuration of conductors and sensing method. First electrodes formed of conductors extending in any one direction and second electrodes formed of conductors extending in a direction perpendicular to the first electrodes form mutual-capacitive sensors in which a dielectric material between the two electrodes is used as a medium. A capacitance C of the sensor is defined as $C=\in \times A/d$ where the distance between the two electrodes is d, the area of an electric charge surface is a, and an equivalent dielectric constant of all dielectric materials between electric charge surfaces is $\in$. The capacitance C has a relationship of $Q=CV$ with an amount Q of electric charges accumulated on the sensor and an electric potential difference (voltage) V applied to two electrodes/electric charge surfaces. When a user approaches a sensor, interference to an electric field formed between the two electrodes occurs to prevent a part of electric charges from being accumulated on the sensor. Therefore, an amount of electric charges accumulated on the sensor is reduced, and consequently the capacitance is reduced. This may be understood as a change in the capacitance caused by a change in an equivalent dielectric constant between the electric charge surfaces due to the user's approach to the sensor, but the actual physical phenomenon is that a part of the electric field between the electric charge surfaces is shunted due to the user's approach so that the amount of electric charge accumulated on the surfaces are reduced. When applying an alternating current (AC) waveform to one electric charge surface of the sensor by connecting an AC voltage source to the first electrode, variation $\Delta Q$ of $\Delta Q=\Delta CV$ in the amount of electric charge with respect to the capacitance C which varies according to a degree of the user's approach to the sensor occurs, and the charge variation is converted into a current or a voltage by a read-out circuit connected to the second electrode. Such converted information is generally subjected to signal processing operations such as noise filtering, demodulation, digital conversion, accumulation, etc. and used in a coordinate tracking algorithm and a gesture recognition algorithm.

An existing touch detection device for detecting a single touch was developed to detect multiple touches, but could only detect an object coming in touch with the device surface. To overcome this limitation, a touch detection device has become possible to detect an object which does not come in touch with but hovers over the device surface or to detect through a touch panel a force input provided by a user pressing the touch panel, or has been developed to additionally include a force sensing device in the touch panel.

According to a mutual-capacitive touch sensing method, an object touches and absorbs an electric field formed between a driving electrode and a sensing electrode, and a resultant change is detected. Therefore, electric fields are intensively formed on a surface of a touch detection device, and it is difficult to detect an object which does not come in touch with but hovers over the surface of the touch detection device using the mutual-capacitive touch sensing method.

As a method of detecting a hovering object, a self-capacitive method of detecting a capacitance between one electrode of a touch panel and a hovering object is preferable. However, a change in the capacitance between a driving electrode and the hovering object caused by movement of the hovering object is $\frac{1}{10}$ to $\frac{1}{100}$ of a change in the capacitance which is required to be detected in the mutual-capacitive method. Also, with reductions in the size and the thickness of a touch panel, a resistance value of electrodes and capacitance values of capacitors, such as a parasitic capacitance between an electrode and the ground, a parasitic capacitance between electrodes, etc., intrinsically inherent in the panel have become hundreds of times to tens of thousands of times of a capacitance value formed by a hovering object. Therefore, according to related art, it is difficult to overcome the influence of intrinsically inherent capacitance and detect a hovering object.

Also, in a method of detecting an input provided by a user applying force to a force sensing device, a change in a capacitance value may be used. In an existing force sensing device, intrinsically inherent capacitance values of capacitors, such as a parasitic capacitance between an electrode and the ground, a parasitic capacitance between electrodes, etc., are larger than a change in capacitance caused by a force input provided by a user. Along with a trend toward reductions in the size and the thickness of an electronic device, a parasitic capacitance value and a capacitance value of a force sensing capacitor are continually increasing, but a change in capacitance caused when a user applies force to a touch panel is decreasing. Therefore, it is getting more difficult to detect an input of a user with accuracy and sensitivity for ensuring reliability.

SUMMARY

The present invention is directed to providing an apparatus and method for efficiently detecting in a self-capacitance method a small change in capacitance caused by a hovering object in spite of intrinsically inherent capacitance of capacitors.

The present invention is also directed to providing an apparatus and method for detecting a change in capacitance caused by a force input with high accuracy and sensitivity in spite of intrinsically inherent capacitance of capacitors.

According to an aspect of the present invention, there is provided a method of detecting a hovering object, the method including: an operation of precharging a compensation capacitor and a parallel capacitor, which is obtained by connecting in parallel a self-capacitor formed between an object hovering over a touch panel and an electrode of the touch panel and an electrode capacitor of the touch panel, with a predetermined voltage; a first charge sharing operation of sharing charges by connecting the parallel capacitor and the compensation capacitor in series; a second charge sharing operation of sharing charges by connecting the parallel capacitor and the compensation capacitor in parallel; and an operation of detecting an electrical signal provided by the parallel capacitor while the parallel capacitor and the compensation capacitor are connected in parallel.

According to another aspect of the present invention, there is provided an apparatus for detecting a hovering object, the apparatus including: a touch panel configured to include an electrode constituting a self-capacitor together with a hovering object and having an electrode capacitor; a switching unit configured to include a compensation capacitor for compensating the electrode capacitor and connect the self-capacitor, the electrode capacitor, and the compensation capacitor in parallel or series; and a detection circuit configured to detect an electrical signal changing according to whether the hovering object approaches. The switching unit precharges the compensation capacitor and a parallel capacitor obtained by connecting the self-capacitor and the electrode capacitor in parallel, performs first charge sharing by connecting the compensation capacitor and the parallel capacitor in series, performs second charge sharing by connecting the compensation capacitor and the parallel capacitor in parallel, receives the electrical signal from the self-capacitor, and provides the electrical signal to the detection circuit.

According to another aspect of the present invention, there is provided a switching matrix provided with a power supply voltage and a first reference voltage, the switching matrix including: a plurality of switches; a node electrically connected to an input and an output; a first capacitor having one end connected to the node and the other end connected to the first reference voltage; a second capacitor connected to the node; and a controller configured to control the plurality of switches. The controller controls the plurality of switches in a first phase so that the power supply voltage is separately provided to the first capacitor and the second capacitor, controls the plurality of switches in a second phase so that the power supply voltage, the second capacitor, and the first capacitor are connected in series, and controls the plurality of switches in a third phase so that the first capacitor and the second capacitor are connected in parallel.

According to another aspect of the present invention, there is provided an apparatus for determining a compensation capacitance, the apparatus including: a touch panel configured to include an electrode constituting a self-capacitor together with a hovering object and having a parasitic capacitor; a switching unit configured to include a compensation capacitor for compensating the parasitic capacitor and connect the self-capacitor, the parasitic capacitor, and the compensation capacitor in parallel or series; a compensation circuit configured to determine a capacitance of the compensation capacitor, and including a capacitor array including a plurality of capacitors, a plurality of switches, and a controller configured to control an equivalent capacitance of the capacitor array by controlling the plurality of switches, and a detection circuit configured to generate an electrical signal according to a change of the equivalent capacitance. The controller determines as the compensation capacitor a capacitor having an equivalent capacitance causing the electrical signal according to a change of the equivalent capacitance to be within a predetermined range.

According to another aspect of the present invention, there is provided an apparatus for detecting a force input, the apparatus including: a cover window configured to be deformed by a force input provided by an object; a force sensing layer which is an electrode of a force sensing capacitor whose capacitance value changes according to the deformation of the cover window; and a force input detector configured to detect the force input. The force input detector includes a compensation capacitor configured to compensate the force sensing capacitor; a switching unit configured to switch an electrical connection between the force sensing capacitor and the compensation capacitor; and a detection circuit configured to detect an electrical signal changing according to a change in the capacitance value of the force sensing capacitor.

According to another aspect of the present invention, there is provided a method of compensating for a force sensing capacitance, the method including: (a) precharging with a supply voltage a compensation capacitor and a force sensing capacitor formed of a force sensing layer and a reference electrode; (b) performing first charge sharing by connecting the force sensing capacitor and the compensation capacitor in series between the supply voltage and a reference voltage; (c) performing second charge sharing so that the force sensing capacitor and the compensation capacitor have an identical voltage; and (d) outputting a voltage generated through the second charge sharing.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which:

FIG. 7 is a diagram illustrating an apparatus for determining a compensation capacitance.

DETAILED DESCRIPTION

Figure 1:
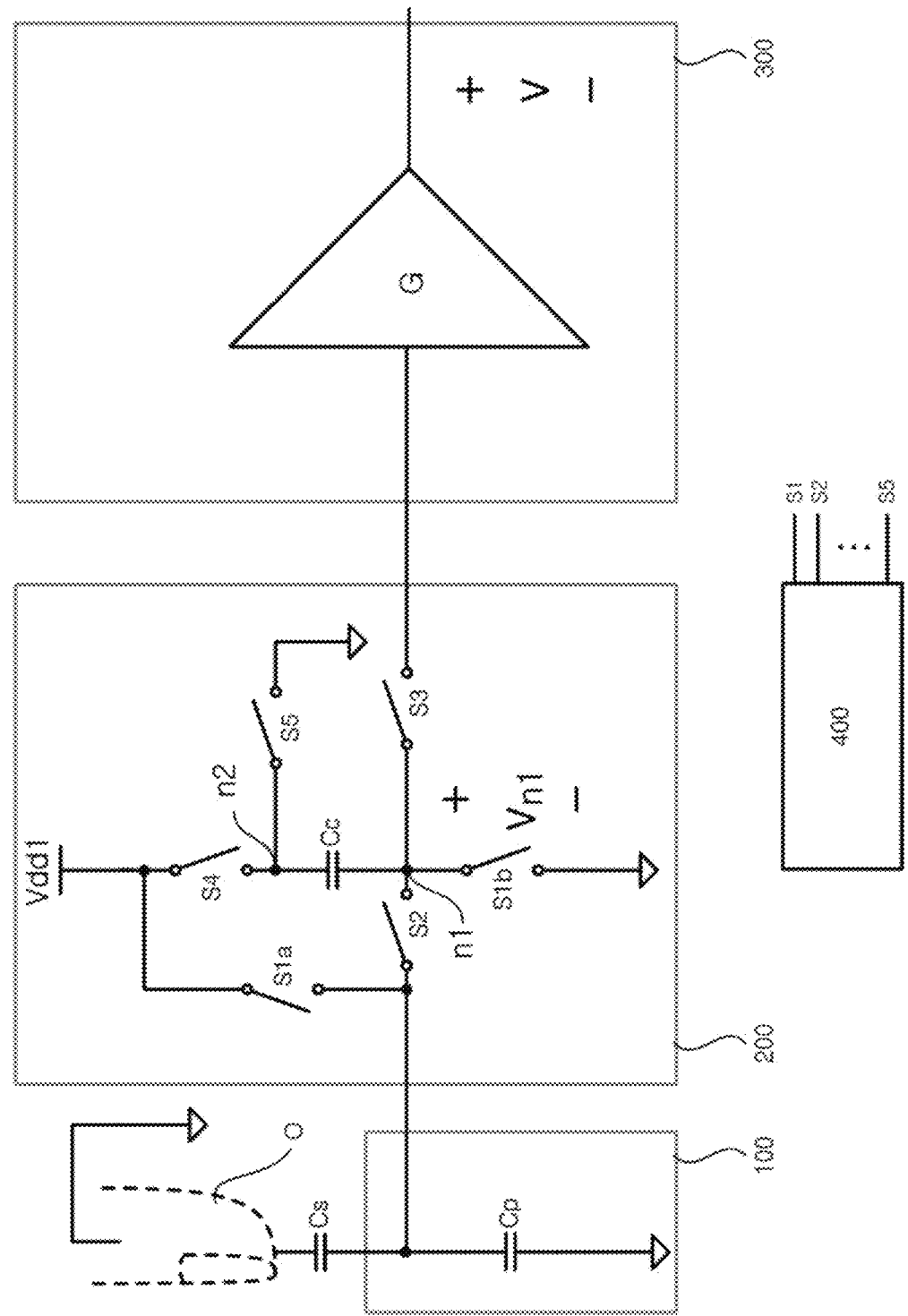
FIG. 1 is a diagram showing an outline of an apparatus for detecting a hovering object according to an exemplary embodiment.

Specific structural and functional details disclosed herein are merely representative for purposes of describing the exemplary embodiments of the present invention, and the present invention may be embodied in many alternate forms and should not be construed as limited to the exemplary embodiments of the present invention set forth herein. Accordingly, while the present invention is susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention.

The terminology used in this specification should be understood as follows.

The terms "first," "second," etc. are used to describe various elements. However, the scope of the present invention should not be limited by these terms since these terms are only used to distinguish one element from other elements. For example, a first element could be termed a second element, and vice versa.

It will be understood that when an element is referred to as being "on" or "above" another element, it can be directly on or above the other element, or intervening elements may also be present. On the other hand, it will be understood that when an element is referred to as being "in contact with" another element, there is no intervening element. Meanwhile, other terms for describing relationships between elements, that is, "interposed between" and "directly interposed between," "between" and "directly between," "adjacent to" and "directly adjacent to," etc., will be understood in the same way.

The singular forms "a," "an," and "the" are intended to include the plural forms as well, unless the context clearly indicates otherwise. It will be further understood that the terms "comprise," "include," and "have," when used herein, specify the presence of stated features, integers, steps, operations, elements, parts, or combinations thereof, but do not preclude the presence or addition of one or more other features, integers, steps, operations, elements, parts, or combinations thereof.

It should also be noted that in some alternative implementations, the functions/operations noted in the blocks may occur out of the order noted in the flowcharts. For example, two blocks shown in succession may in fact be executed substantially concurrently or the blocks may sometimes be executed in the reverse order, depending upon the functionality/operations involved.

In reference drawings for describing exemplary embodiments of the present disclosure, size, height, thickness, etc. are intentionally exaggerated for convenience of description and ease of understanding, but are not enlarged or reduced according to a ratio. Also, in the drawings, some elements may be intentionally reduced, and other elements may be intentionally enlarged.

Although drawings illustrating exemplary embodiments are the same or similar to each other, the drawings may have different drawing numbers to describe different exemplary embodiment.

Unless otherwise defined, all terms used herein have the same meaning as commonly understood by those of ordinary skill in the art to which the present invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the phrase "intrinsically inherent capacitance" denotes the capacitance of a capacitor which unintentionally exists as well as the capacitance of a capacitor which is intentionally formed.

As an example, in an exemplary embodiment shown in FIG. 8(A), a force sensing capacitor Cf is formed of a force sensing layer 1500 and a metal body 1400. However, the intrinsically inherent capacitance of a capacitor includes not only the capacitance of the force sensing capacitor Cf but also the capacitance of a parasitic capacitor formed between the force sensing layer 1500 and a display unit 1300, the capacitance of a parasitic capacitor formed between the force sensing layer 1500 and a touch sensing layer 1200, and so on.

Figure 2:
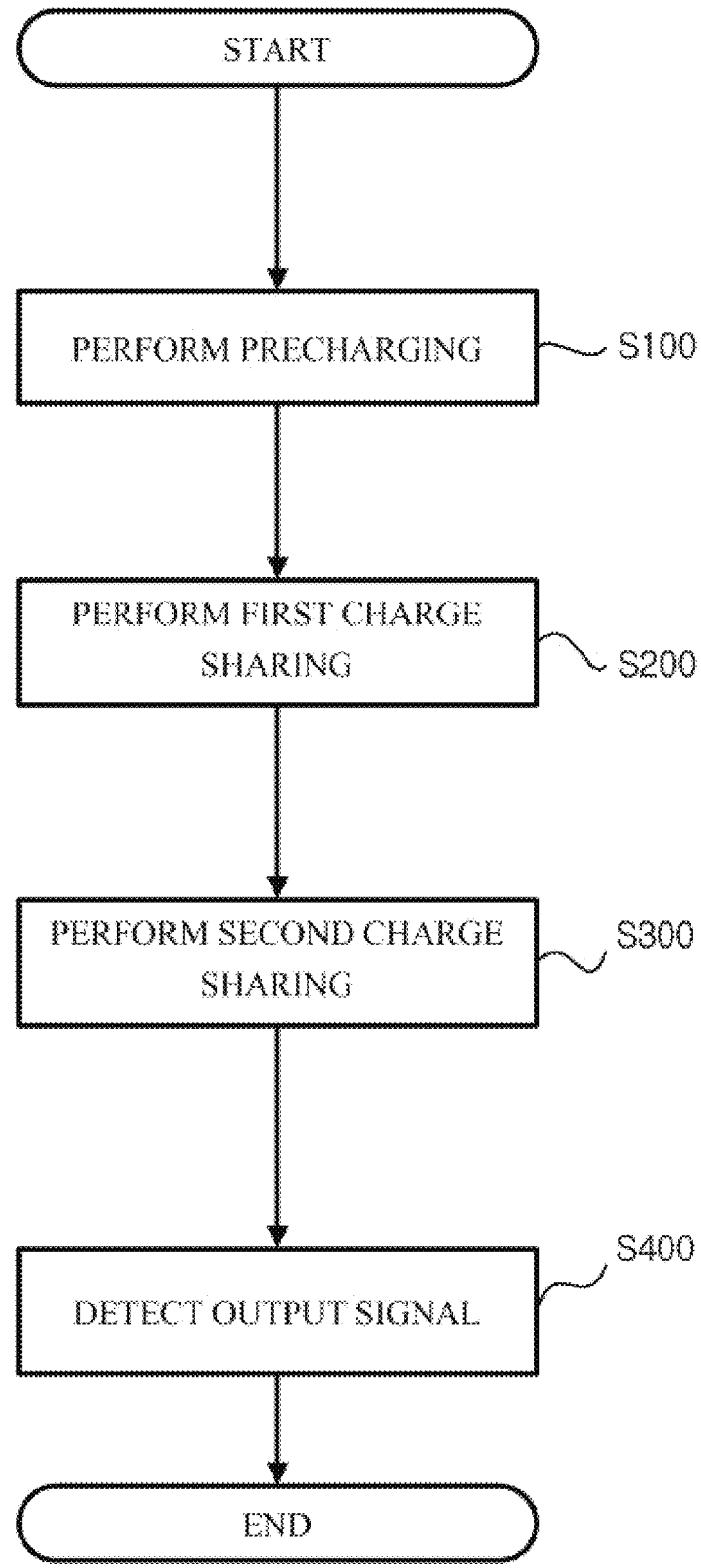
FIG. 2 is a flowchart showing an outline of a method of detecting a hovering object according to an exemplary embodiment.

Hereinafter, exemplary embodiments will be described with reference to the accompanying drawings. FIG. 1 is a diagram showing an outline of an apparatus for detecting a hovering object according to an exemplary embodiment, and FIG. 2 is a flowchart showing an outline of a method of detecting a hovering object according to an exemplary embodiment. Referring to FIG. 1, the apparatus for detecting a hovering object according to the exemplary embodiment includes a touch panel 100 including an electrode which constitutes a self-capacitor Cs together with a hovering object O and has a parasitic capacitor Cp, a switching unit 200 which includes a compensation capacitor Cc for compensating the parasitic capacitor Cp and connects a parallel capacitor obtained by connecting the self-capacitor Cs and the parasitic capacitor Cp in parallel and the compensation capacitor Cc in parallel or series, and a detection circuit 300 which detects an electrical signal changing according to whether or not the hovering object O approaches.

Referring to FIG. 2, the method of detecting a hovering object according to the exemplary embodiment includes an operation of precharging with a predetermined voltage a compensation capacitor and a parallel capacitor obtained by connecting in parallel a panel electrode capacitor and a self-capacitor formed between an object hovering over a touch panel and an electrode of the touch panel (S100), a first charge sharing operation of sharing charges by connecting the parallel capacitor and the compensation capacitor in series (S200), a second charge sharing operation of sharing charges by connecting the parallel capacitor and the compensation capacitor in parallel (S300), and an operation of detecting an electrical signal provided by the parallel capacitor while the parallel capacitor and the compensation capacitor are connected in parallel (S400).

In this specification, a thing with which a user can apply a touch input or a hovering input to a touch panel or apply a force input to a force input detection device is defined as an object. An object denotes a thing, such as a hand, a palm, a stylus, etc., which touches or hovers over the touch panel 100 to apply a touch input or deforms a cover window (see 1100 in FIGS. 8(A) and 8(B)) to provide a force input. However, this is intended not to limit the scope of an object but to describe an object.

Referring to FIG. 1, the touch panel 100 includes at least one electrode (not shown). The electrode functions as one electrode of the self-capacitor Cs, and the object O functions as the other electrode of the self-capacitor Cs.

$$C = e\frac{A}{d} \qquad \text{[Equation 1]}$$

(C: capacitance, A: the area of an electrode, d: the distance between electrodes)

Referring to Equation 1 for calculating the capacitance of a capacitor, when the distance d between the hovering object O and the electrode increases, the capacitance of the self-capacitor Cs is reduced, and when the distance d decreases, the capacitance of the self-capacitor Cs increases. When the distance between an object having a diameter of about 10 mm and an electrode is 1 cm or more, the capacitance of the self-capacitor Cs has a value of several femto-farads to 10 femto-farads. Therefore, using an existing apparatus and method for detecting a hovering object, it is difficult to overcome an influence of a parasitic capacitor, that is, about hundreds of pico-farads, and to detect a self-capacitance.

The actual touch panel 100 has several parasitic capacitances including a parasitic capacitance generated between an electrode and a ground voltage, a parasitic capacitance generated between adjacent electrodes, and so on. The phrase "parasitic capacitance" is used to indicate an equivalent parasitic capacitance including all parasitic capacitances formed by the electrode which forms a mutual capacitance with the hovering object O.

The electrode of the touch panel 100 forms one electrode of the self-capacitor Cs, and the object O forms the other electrode of the self-capacitor Cs. Since the object O is electrically connected to the ground voltage, the self-capacitor Cs is connected in parallel with the parasitic capacitor Cp. An equivalent capacitance seen from the switching unit 200 is the capacitance of Cp+Cs formed by connecting the self-capacitor Cs and the parasitic capacitor Cp in parallel.

The switching unit 200 includes a plurality of switches S1a, S1b, S2, S3, S4, and S5 and the compensation capacitor Cc. The plurality of switches S1a, S1b, S2, S3, S4, and S5 are turned on or off by signals provided by a controller 400 and may be implemented as field effect transistors (FETs), bipolar junction transistors (BJTs), or so on. On and off of the switches S1a and S1b is controlled by an identical control signal S1. As will be described below, the compensation capacitor Cc compensates for the capacitance of the parasitic capacitor Cp through two charge sharing processes, thereby facilitating detection of an influence of the self-capacitance.

A first power supply voltage Vdd1 provided to the switching unit 200 is obtained by, for example, multiplying a second supply voltage Vdd2 provided to the detection circuit 300, etc., that is, by stepping up the second supply voltage supplied to a chip with a charge pump or a voltage multiplier which is not shown. By supplying the first supply voltage Vdd1 to the self-capacitor Cs, it is possible to increase the amount of charges stored in the self-capacitor Cs, thereby improving the performance of detecting the hovering object O. The compensation capacitor Cc is connected to nodes n1 and n2. As will be described below, the compensation capacitor Cc has a function of compensating for the capacitance of the parasitic capacitor Cp. The compensation capacitor Cc may be replaced with a capacitor array CCa shown in FIG. 7(A). By actively changing a compensation capacitance with respect to a change in the parasitic capacitance caused by an environmental change, it is possible to improve the performance of detecting a hovering object.

Figure 3:
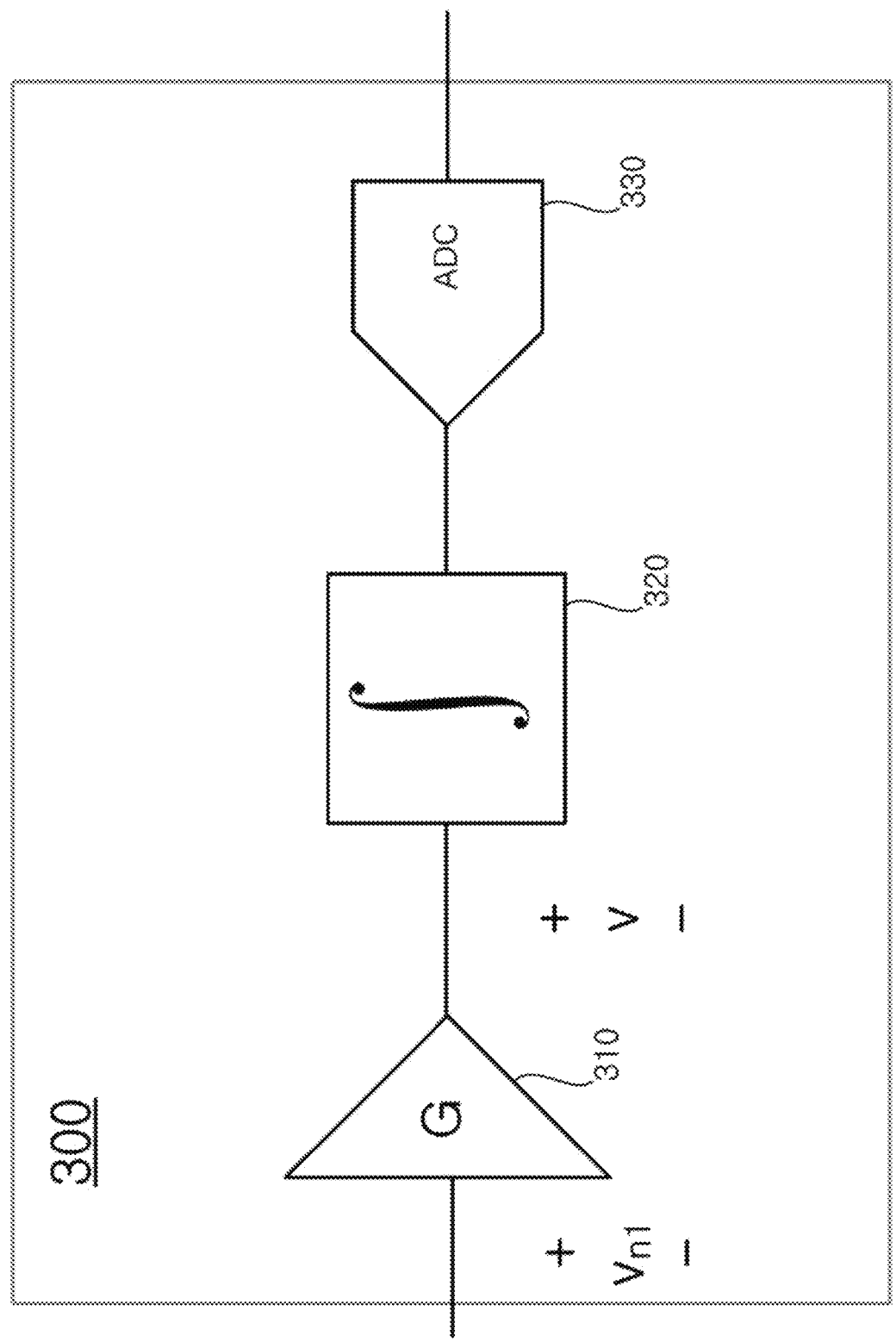
FIG. 3 is a diagram showing an example of a detection circuit.

FIG. 3 is a diagram showing an exemplary embodiment of the detection circuit 300. The detection circuit 300 includes an amplifier 310 which is provided with an electrical signal $V_{n1}$ from the self-capacitor Cs and amplifies the electrical signal $V_{n1}$. A self-capacitance value changes according to the distance between the hovering object O and the electrode. The amplifier 310 is provided with the changing electrical signal $V_{n1}$ and generates an output signal V by amplifying the electrical signal $V_{n1}$.

The amplifier 310 amplifies the input signal with a predetermined gain. Any amplifier which can be provided with an electrical signal and amplify and output the electrical signal can be employed in the apparatus for detecting a hovering object according to the exemplary embodiment. As an example, the amplifier 310 may be a single-ended amplifier, and as another example, the amplifier 310 may be a differential amplifier which amplifies a difference between a predetermined voltage or the ground voltage and the electrical signal.

In an exemplary embodiment, the detection circuit 300 may also include an integrator 320 and an analog-to-digital converter (ADC) 330. The integrator 320 accumulates a signal provided by the amplifier 310 of the detection circuit 300. When an object is a certain distance (e.g., 10 cm) or more away from the electrode of the touch panel, the self-capacitance value becomes 1 fF or less, and a resultant voltage may be similar to a noise level. Therefore, it may be difficult to distinguish between the resultant voltage and a noise level.

When an output of the amplifier 310 is integrated by the integrator 320, converted into a digital signal, and then compared with a noise level having an average power of 0, a signal caused by a hovering object can be easily detected. Subsequently, a signal output by the integrator 320 may be provided to the ADC 330 and converted into a digital signal, and the digital signal may be provided to a digital signal processor for follow-up signal processing.

In an exemplary embodiment, the detection circuit 300 operates provided with the second supply voltage Vdd2 different from the first supply voltage Vdd1 of the switching unit 200. When the detection circuit 300 is designed to operate at a first supply voltage obtained by multiplying the second supply voltage Vdd2, a die area required to implement the detection circuit 300 increases. Therefore, to reduce an area required to implement a function, the detection circuit 300 is implemented to operate at the second supply voltage Vdd2 which is lower than the first supply voltage Vdd1.

Figure 4:
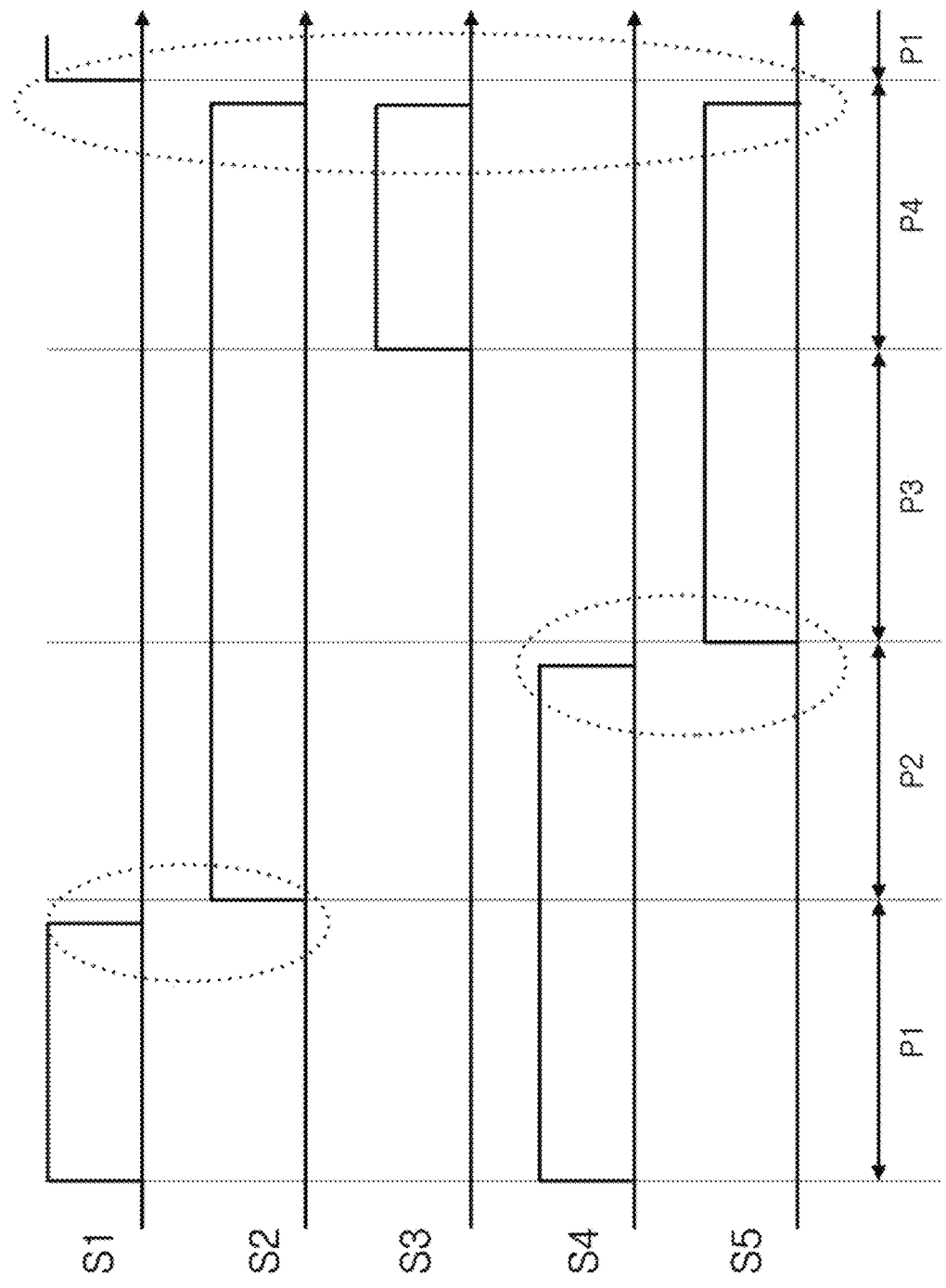
FIG. 4 is an example of a timing diagram of control signals provided to a switching unit by a controller.

An operation of the apparatus for detecting a hovering object which has the above configuration will be described with reference to FIGS. 2 and 4. FIG. 4 is an example of a timing diagram of control signals provided to the switching unit 200 by the controller 400. Referring to FIG. 4, the controller 400 drives the switching unit 200 in a precharge phase P1, a first charge sharing phase P2, a second charge sharing phase P3, and an output phase P4. In an exemplary embodiment, the controller 400 may drive again the switching unit 200 in the precharge phase P1 after the output phase P4.

Referring to portions indicated by dotted lines in FIG. 4, the controller 400 generates control signals so that the control signals do not overlap each other at each boundary of the phases to prevent charges stored in each capacitor from being unintentionally shared or discharged to the ground voltage in a switch conduction and blocking process.

In the example shown in FIG. 4, the switches included in the switching unit 200 are implemented as N type metal oxide semiconductor (MOS) (NMOS) switches. Therefore, when a signal in a HIGH state is provided to a control end of each switch, the switch becomes conductive, and when a signal in a LOW state is provided, the switch is blocked. However, this is merely an example, and the switches can also be implemented as P type MOS (PMOS) switches which become conductive when a signal in the LOW state is provided and are blocked when a signal in the HIGH state is provided or as NPN BJTs or PNP BJTs which are controlled to be conductive or blocked when a positive or negative current is provided to their bases.

Figure 5:
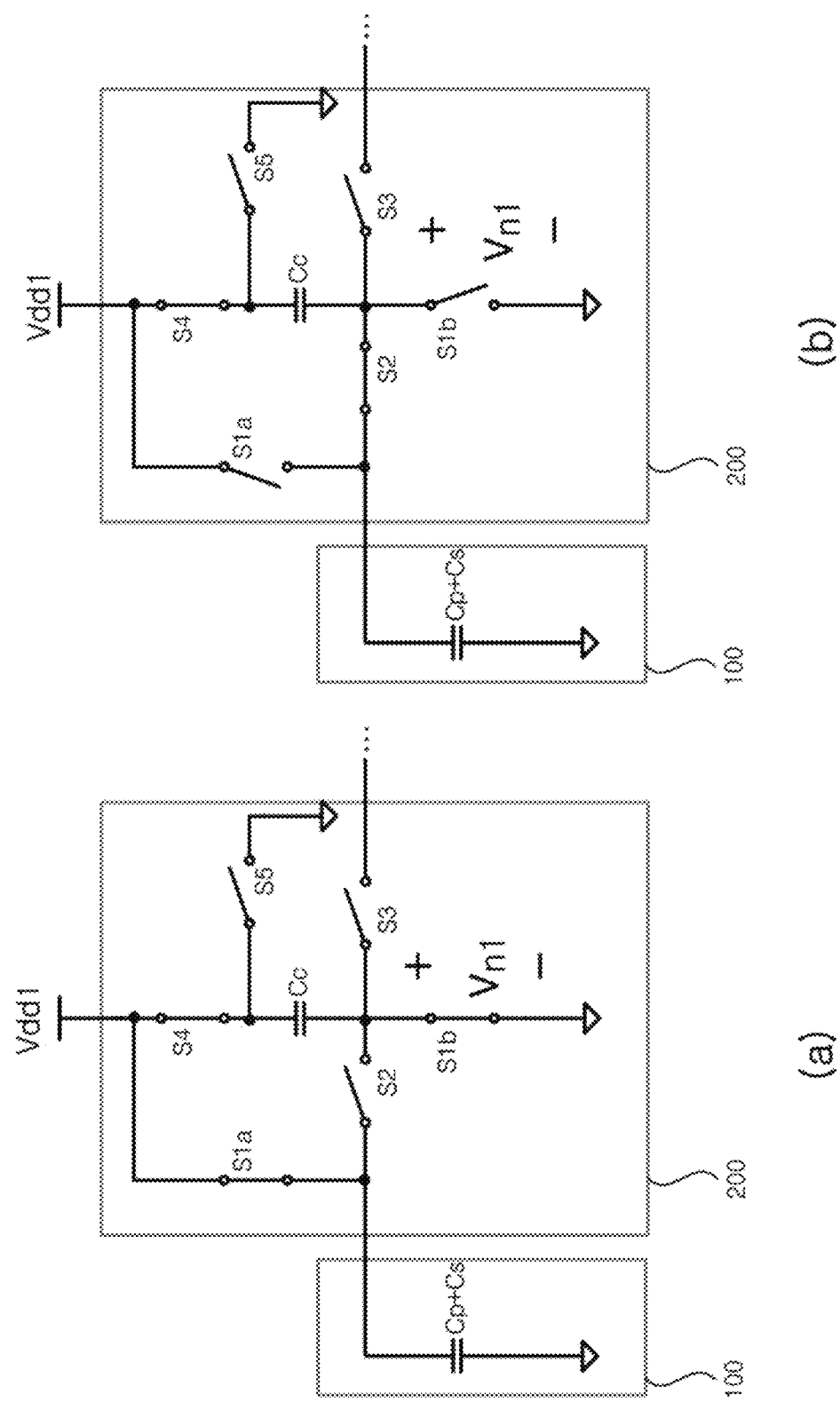
FIGS. 5 and 6 are diagrams showing equivalent circuits according to phase in which a controller controls a switching unit.
Figure 6:
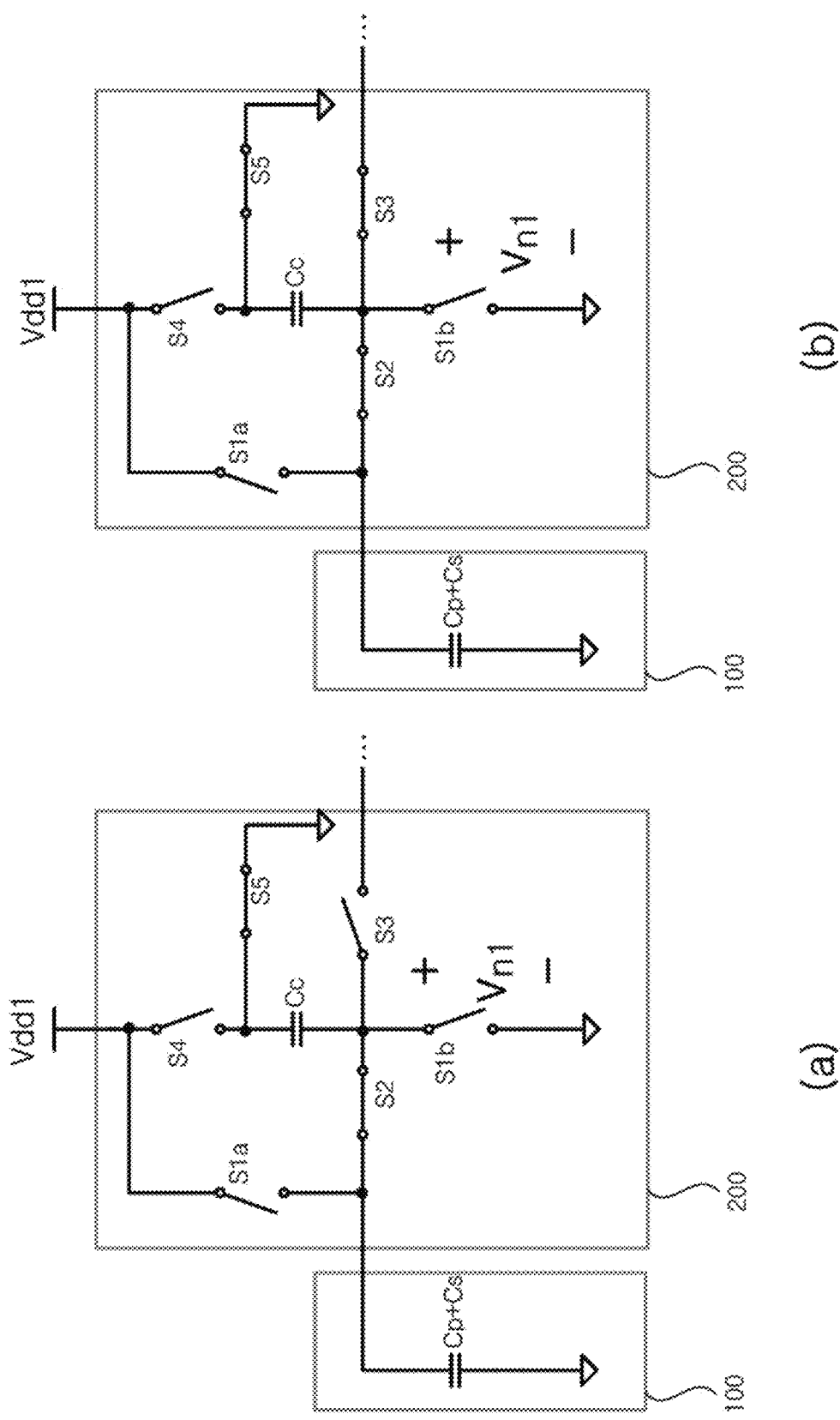

FIGS. 5 and 6 are diagrams showing equivalent circuits according to phase in which the controller 400 controls the switching unit 200. FIG. 5(A) shows an equivalent circuit corresponding to a case in which the switching unit 200 is driven in the precharge phase P1. Referring to FIGS. 2, 4, and 5(A), in the precharge phase P1 of FIG. 4, the switches S1a, S1b, and S4 of the switching unit 200 are controlled to be turned on, and the other switches are controlled to be turned off. Therefore, the switching unit 200 and the touch panel 100 form an equivalent circuit of FIG. 5(A), and the equivalent parallel capacitor Cp+Cs and the compensation capacitor Cc connected in parallel are both charged with the first supply voltage Vdd1 in the precharge phase P1 (S100). In the equivalent circuit, one node of the compensation capacitor Cc and one node of the equivalent parallel capacitor Cp+Cs are provided with the first supply voltage Vdd1, and the other node of the compensation capacitor Cc and the other node of the equivalent parallel capacitor Cp+Cs are connected to the ground voltage. Therefore, the compensation capacitor Cc and the equivalent parallel capacitor Cp+Cs are connected in parallel.

FIG. 5(B) shows an equivalent circuit corresponding to a case in which the switching unit 200 is driven in the first charge sharing phase P2. Referring to FIGS. 2, 4, and 5(B), in the first charge sharing phase P2, the switches S2 and S4 are controlled to be conductive, and the other switches are controlled to be blocked. In the equivalent circuit, the compensation capacitor Cc and the equivalent parallel capacitor Cp+Cs are connected in series between the first supply voltage Vdd1 and the ground voltage. Charges stored in the compensation capacitor Cc and the equivalent parallel capacitor Cp+Cs in the precharge phase P1 are distributed in the first charge sharing phase P2 (S200). A voltage Vn formed at the equivalent parallel capacitor Cp+Cs due to the charge distribution in the first charge sharing phase P2 is as shown in Equation 2.

[Equation 2]

$$V_{n1} = V_{dd1} \frac{Cp + Cs}{Cc + Cp + Cs} \qquad ①$$

$$= V_{dd1} \frac{Cp}{Cc + Cp} \qquad ②$$

For example, when the first supply voltage Vdd1 is 9 V, and the second supply voltage Vdd2 is 2V, the capacitance of the self-capacitor Cs is so smaller than Cp+Cc, which is the sum of the capacitances of the parasitic capacitor Cp and the compensation capacitor Cc, that the capacitance of the self-capacitor Cs can be ignored. Therefore, ① of Equation 2 can be approximated to ②.

When the capacitance of parasitic capacitor Cp is 100 pF, the capacitance of the compensation capacitor Cc should be 800 pF so that the voltage Vn becomes 1 V which is half the second supply voltage Vdd2. However, the capacitance of 800 pF is too high to be obtained in a chip, and it is uneconomical to form a capacitor having such a capacitance in a chip.

FIG. 6(A) shows an equivalent circuit corresponding to a case in which the switching unit 200 is driven in the second charge sharing phase P3. Referring to FIGS. 2, 4, and 6(A), in the second charge sharing phase P3, the switches S2 and S5 are controlled to be conductive, and the other switches are controlled to be blocked (S300). In the second charge sharing phase P3, charges stored in the compensation capacitor Cc and the equivalent parallel capacitor Cp+Cs in the first charge sharing phase P2 are distributed again (S300). The voltage Vn formed at the equivalent parallel capacitor Cp+Cs in the second charge sharing phase P3 is as shown in Equation 3.

[Equation 3]

$$V_n = V_{dd1} \frac{Cp + Cs - Cc}{Cc + Cp + Cs} \qquad ①$$

$$\approx V_{dd1} \frac{Cp - Cc}{Cp + Cc} \qquad ②$$

In ① of Equation 3, the capacitance of the self-capacitor Cs is so smaller than Cp+Cc, which is the sum of the capacitances of the parasitic capacitor Cp and the compensation capacitor Cc, that the capacitance of the self-capacitor Cs can be ignored. Therefore, ① of Equation 3 can be approximated to ②. When the capacitance of the parasitic capacitor Cp is 100 pF and the output voltage Vn is intended to be 1 V which is half the second supply voltage Vdd2 like in the first charge sharing phase P2, a capacitor having a capacitance of 80 pF is necessary, which is only about 10% of the capacitance value obtained in the previous phase. In an exemplary embodiment, it is possible to adjust the output voltage Vn of the switching unit 200 to a specific voltage value by adjusting the capacitance of the compensation capacitor Cc as described above.

In another exemplary embodiment, when the capacitance of the compensation capacitor Cc is equalized to the parasitic capacitance in ① of Equation 3, an influence of the parasitic capacitance can be removed from the numerator, and it is possible to reduce the influence of the parasitic capacitance. Therefore, the influence of the parasitic capacitance on the output voltage Vn can be reduced, and it is possible to increase an influence of the self-capacitance caused by the hovering object O.

In the output phase P4, while maintaining switches which have been turned on in the second charge sharing phase P3 in the turn-on state and maintaining switches which have been turned off in the turn-off state, the controller 400 turns on the switch S3 and provides the voltage Vn to the detection circuit 300 (S400). The detection circuit 300 amplifies the provided signal with a preset gain G and provides the amplified signal to the subsequent circuit, so that the hovering object O can be detected.

In an exemplary embodiment, the detection circuit 300 may also include the integrator 320 and the ADC 330 as shown in FIG. 3. As described above, when the amplifier output is integrated using the integrator 320 and then compared with a noise level having an average power of 0, a signal caused by a hovering object can be easily detected. Subsequently, by converting a signal output by the integrator 320 into a digital signal, it is possible to obtain information including the location of the hovering object O, the calculated distance between the hovering object O and the electrode, and so on.

A case of determining a compensation capacitance will be described below with reference to FIG. 7. FIG. 7(A) is a circuit diagram schematically showing a capacitor array used in an apparatus for determining a compensation capacitance according to an exemplary embodiment, and FIG. 7(B) is a diagram showing simulation results of the apparatus for determining a compensation capacitance.

Referring to FIG. 7(A), the apparatus for determining a compensation capacitance according to the exemplary embodiment includes the capacitor array CCa. The capacitor array CCa includes a plurality of capacitors C1, C2, . . . , and Cn and a plurality of switches SW1, SW2, . . . , and SWn, and also includes the controller 400 which controls conductivity of the plurality of switches SW1, SW2, . . . , and SWn. As an example, the controller 400 may be a controller which controls conductivity of the switches included in the switching unit 200.

All the plurality of capacitors C1, C2, . . . , and Cn included in the capacitor array CCa may have the same capacitance value. In this case, the number of capacitors connected to the first node n1 and the second node n2 is controlled to determine an equivalent capacitance of the capacitor array CCa. In another exemplary embodiment, the plurality of capacitors C1, C2, . . . , and Cn included in the capacitor array CCa may have different capacitance values.

The controller 400 controls an equivalent capacitance of the capacitor array CCa by controlling whether or not to make the plurality of switches SW1, SW2, . . . , and SWn conductive. As an example, when the controller 400 performs control to make only the switch SW1 conductive among the plurality of switches SW1, SW2, . . . , and SWn, the equivalent capacitance of the capacitor array CCa becomes C1, and when the controller 400 performs control to make all the plurality of switches SW1, SW2, . . . , and SWn conductive, the equivalent capacitance of the capacitor array CCa becomes C1+C2+ . . . +Cn.

The capacitor array CCa can be replaced with the compensation capacitor Cc shown in FIG. 1 as an example, and the capacitance of the compensation capacitor (see Cc in FIG. 1) may be determined as the equivalent capacitance of the capacitor array CCa.

FIG. 7(B) is a diagram showing a determination of a capacitance of the compensation capacitor Cc made by adjusting the equivalent capacitance value of the capacitor array CCa. Referring to FIG. 7(B), in an exemplary embodiment, the controller 400 implements any one equivalent capacitance which can be implemented with the capacitor array CCa, and finds a resultant output voltage. When the output voltage is not included in an intended range of the output voltage, the controller 400 changes the equivalent capacitance value and then finds an output voltage.

As an example, the controller 400 may find an output voltage while changing the equivalent capacitance of the capacitor array CCa from the maximum to the minimum, and as another example, the controller 400 may find an output voltage while changing the equivalent capacitance of the capacitor array CCa from the minimum to the maximum. In the exemplary embodiment shown in FIG. 7(B), the intended range of the output voltage is 0.9 V which is an intermediate level between the ground voltage and the second supply voltage Vdd2 of 1.8 V provided to the detection circuit 300.

When the output voltage reaches to the intended range (an ellipse; compensation point) while the controller 400 changes the equivalent capacitance of the capacitor array CCa, the controller 400 selects the corresponding equivalent capacitance for the compensation capacitor Cc.

The apparatus for detecting a hovering object may be fixedly located in any one place, or the location of the apparatus may be changed like a cellular phone, a tablet personal computer (PC), or a laptop computer. In the former case as well as the latter case, the parasitic capacitance value may increase or decrease due to a change in ambient temperature, humidity, and so on. The change in the parasitic capacitance value may lead to a degradation of the performance of detecting a hovering object. However, according to the exemplary embodiment, it is possible to improve the performance of detecting a hovering object by actively coping with the parasitic capacitance which changes depending on surroundings and the location of the apparatus for detecting a hovering object.

Also, the apparatus for detecting a hovering object according to the exemplary embodiment has a compensation capacitor for compensating for a parasitic capacitance of a touch panel and thus increase an influence of a self-capacitor formed between an electrode and a hovering object. Therefore, it is possible to detect a hovering object with higher accuracy and sensitivity.

Figure 8:
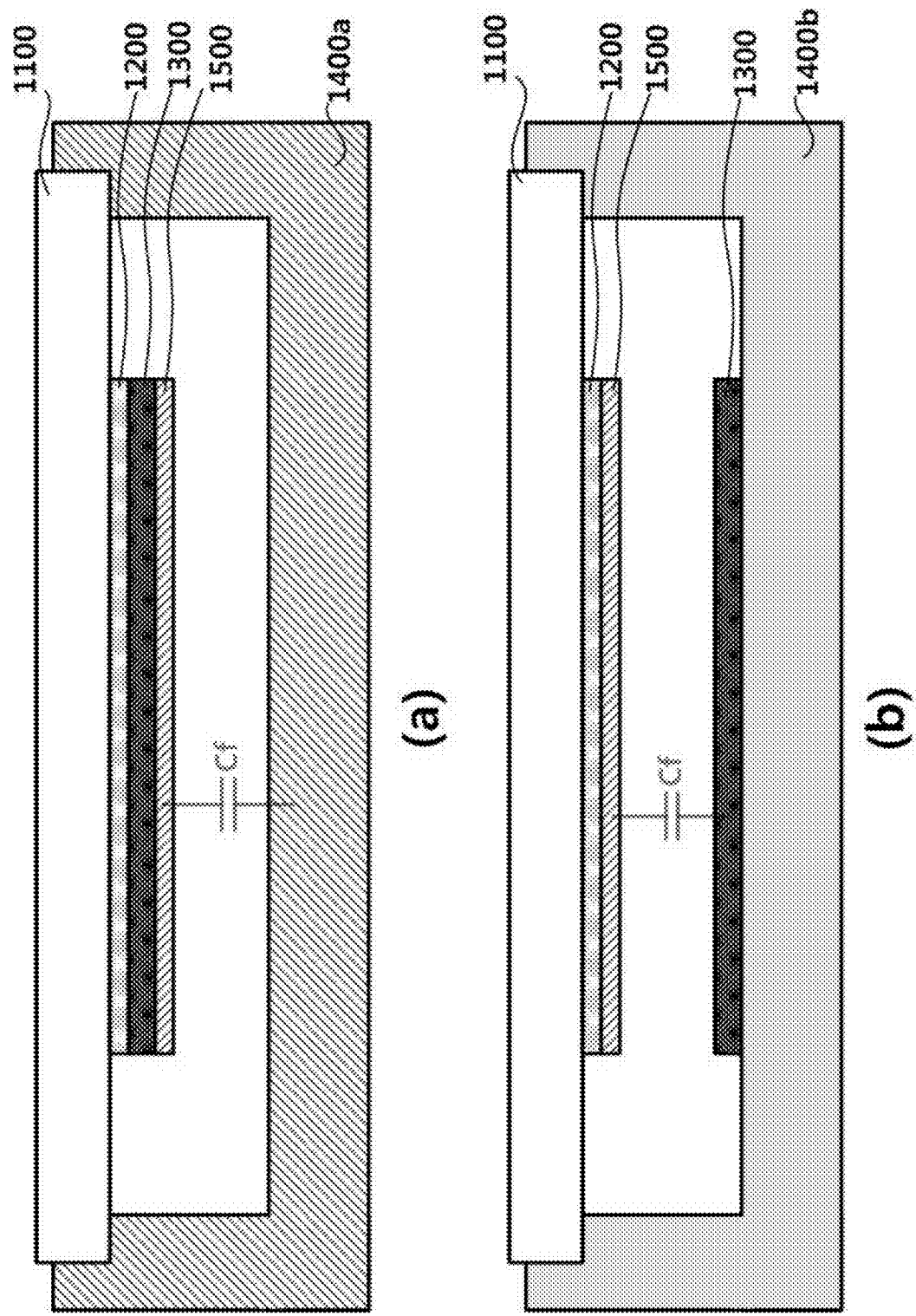
FIG. 8 is a diagram showing an outline of an apparatus for detecting a hovering object according to an exemplary embodiment.
Figure 9:
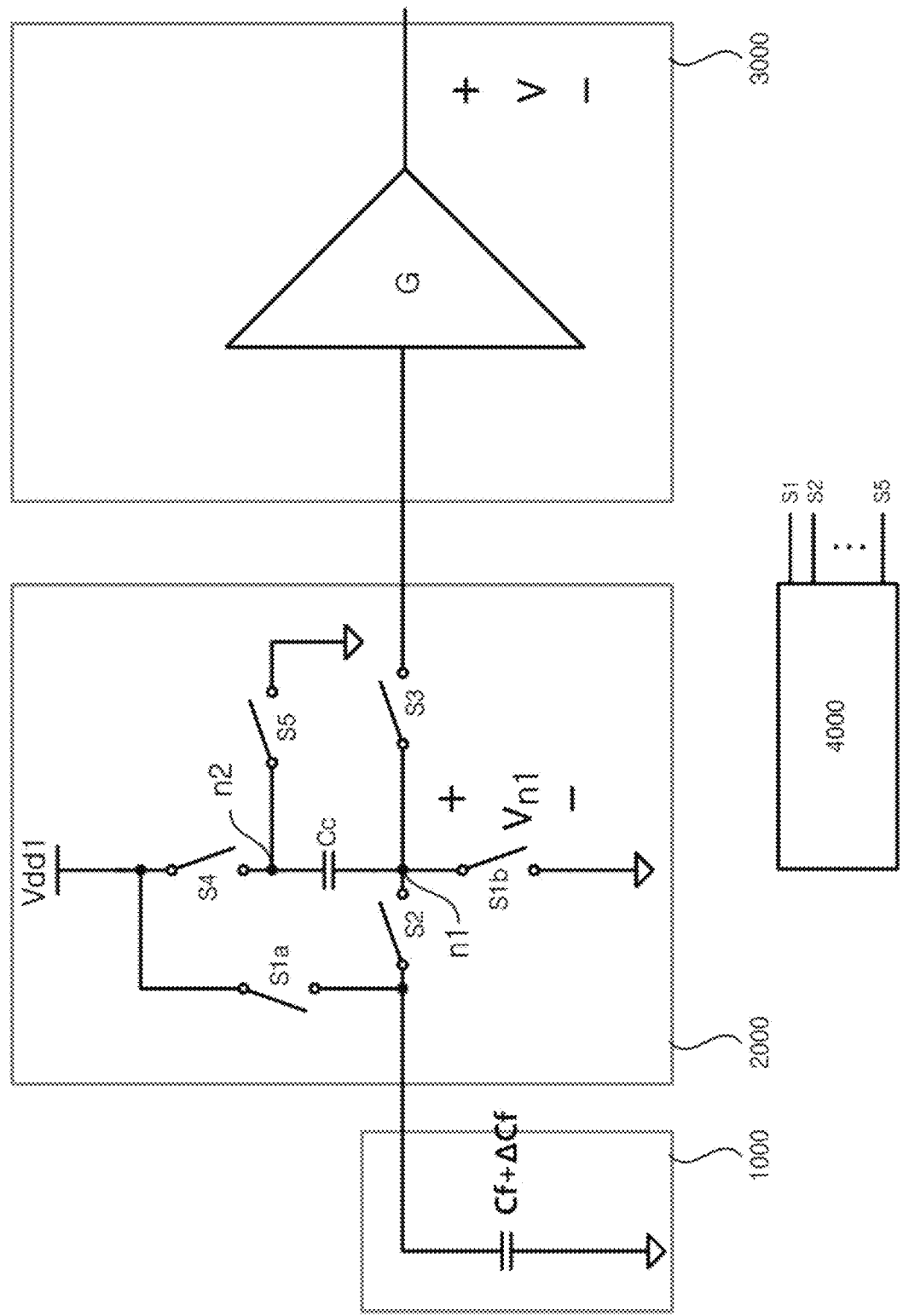
FIG. 9 is a block diagram showing an outline of the apparatus for detecting a force input.

An apparatus and method for detecting a force input according to exemplary embodiments will be described below with reference to FIGS. 8 to 16. FIGS. 8(A) and 8(B) are cross-sectional views showing an outline of an apparatus for detecting a force input according to an exemplary embodiment, and FIG. 9 is a block diagram showing an outline of the apparatus for detecting a force input according to the exemplary embodiment. Referring to FIGS. 8(A), 8(B), and 9, the apparatus for detecting a force input according to the exemplary embodiment includes the cover window 1100 deformed by a force input provided by an object, the force sensing layer 1500 which is one electrode of a force sensing capacitor Cf whose capacitance value changes according to the deformation of the cover window 1100, and a force input detector which detects a force input. The force input detector includes a compensation capacitor Cc which compensates the force sensing capacitor Cf, a switching unit 2000 which switches the electrical connection between the force sensing capacitor Cf and the compensation capacitor Cc, and a detection circuit 3000 which detects an electrical signal changing according to a change in the capacitance value of the force sensing capacitor Cf. In an exemplary embodiment, the apparatus for detecting a force input according to the exemplary embodiment also includes a controller 4000 which controls switches included in the switching unit 2000.

Referring to FIGS. 8(A) and 8(B), the apparatus for detecting a force input according to the exemplary embodiment includes the cover window 1100 which is deformed by a force input provided by an object O. For example, the cover window 1100 is formed of a transparent material which is transparent to an image provided by the display unit 1300, thus providing the image to a user. In another example, the cover window 1100 may be formed of an opaque material when the apparatus for detecting a force input does not include the display unit 1300. For example, the cover window 1100 is formed of tempered glass. In another example, the cover window 1100 may be formed of a synthetic resin, such as polycarbonate, acryl, and so on.

In an exemplary embodiment, the apparatus for detecting a force input may include the touch sensing layer 1200 which detects a touch input. For example, the touch sensing layer 1200 includes a dielectric substrate, a driving electrode disposed on one surface of the dielectric substrate, and a sensing electrode disposed on the other surface of the dielectric substrate, or the dielectric substrate and a driving electrode and a sensing electrode disposed on one surface of the dielectric substrate, detecting a touch input in a mutual capacitance type.

In another example, the touch sensing layer detects a touch in a self-capacitance type. A first electrode and a second electrode may be formed in a dielectric substrate, and it is possible to detect a touch input by detecting a capacitance caused between an object coming in touch with the apparatus and the first electrode, a capacitance caused between the object and the second electrode, or a ratio between the capacitances.

In an exemplary embodiment, bodies 1400a and 1400b have spaces for accommodating the force sensing layer 1500, etc. therein, and are covered by the cover window 1100. As shown in FIG. 8(A) by way of example, the metal body 1400a is formed of a conductive material and functions as an electrode of the force sensing capacitor Cf. For example, the metal body 1400a may be electrically connected to a reference voltage. According to an exemplary embodiment shown in FIG. 8(B), the body 1400b may be formed of an insulator such as a synthetic resin, and so on.

The display unit 1300 displays an image to the user. For example, the display unit 1300 may be a liquid crystal display (LCD) panel. In another example, the display unit 1300 may be an organic light-emitting device (OLED) panel. A reference electrode provided with a reference voltage may be included in the display unit 1300. In an exemplary embodiment shown in FIG. 8(B), an electrode included in the display unit 1300 may constitute the force sensing capacitor Cf together with the force sensing layer 1500.

Figure 10:
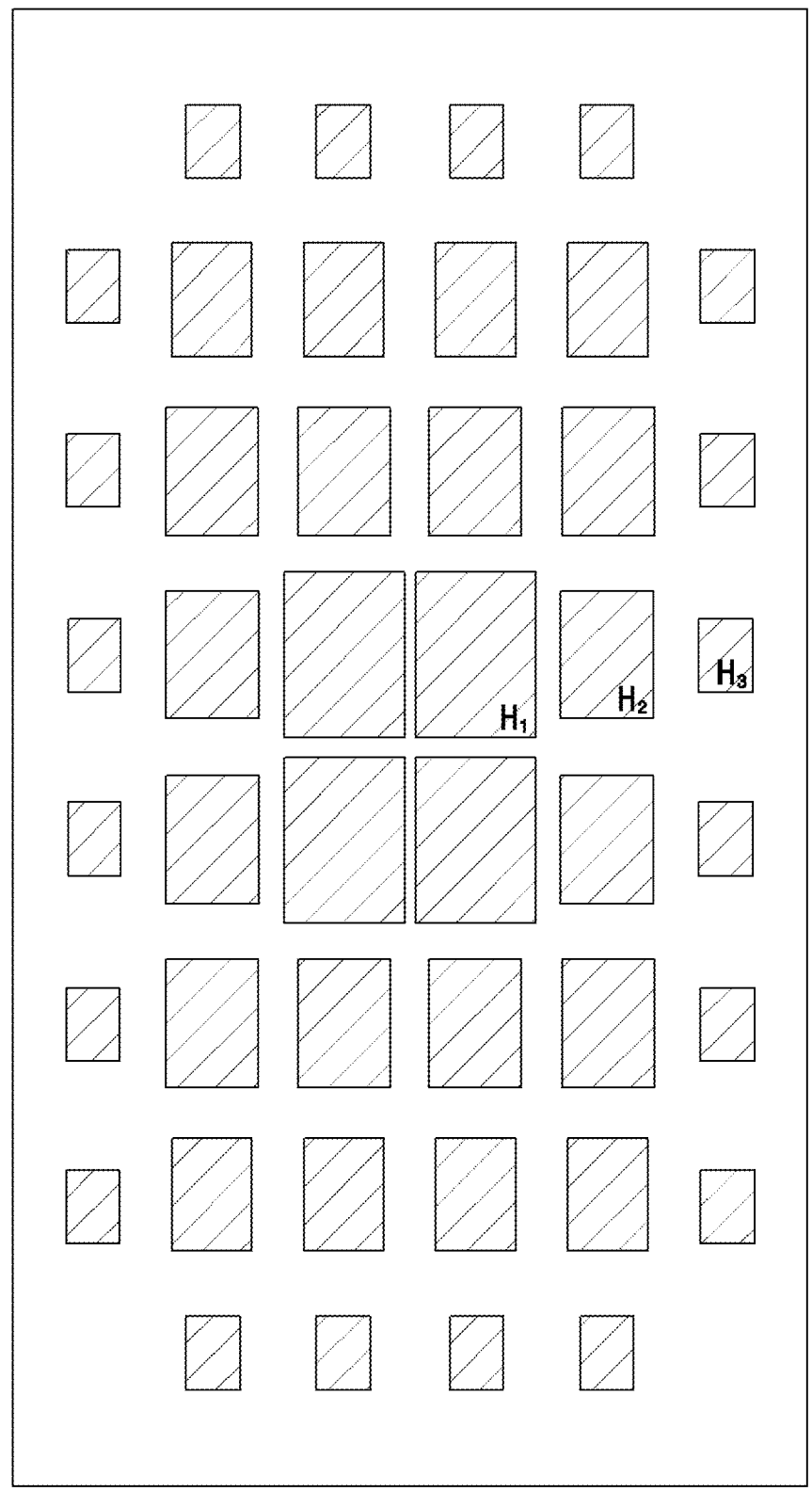
FIG. 10 is a diagram showing an outline of the force sensing layer.

The force sensing layer 1500 is an electrode of the force sensing capacitor Cf and is deformed according to deformation of the cover window 1100 caused by a force input provided by an object. FIG. 10 is a diagram showing an outline of the force sensing layer 1500. Referring to FIG. 10, the force sensing layer 1500 includes a conductive pattern having a porous structure. A hole H1 in a central area is formed to have a larger area than holes H2 and H3 in a peripheral area, and a hole is formed to have an area decreasing as the distance from the center increases. In an exemplary embodiment, the force sensing layer 1500 may be formed by patterning any one of indium tin oxide (ITO), indium zinc oxide (IZO), aluminum zinc oxide (AZO), indium cadmium oxide (ICO), and a carbon nanotube (CNT) film, which are conductive materials, on a flexible insulating film.

In the exemplary embodiment shown in FIG. 8(A), two electrodes of the force sensing capacitor Cf may be the force sensing layer 1500 and the metal body 1400a. For example, the metal body 1400a may be electrically connected to the reference voltage. In the exemplary embodiment shown in FIG. 8(B), when the body 1400b is formed of a nonconductor such as a synthetic resin, etc., the force sensing layer 1500 may constitute the force sensing capacitor Cf together with an electrode included in the display unit 1300. In an exemplary embodiment not shown in the drawings, the force sensing layer 1500 is disposed in the nonconductor body, and the display unit 1300 is attached to the touch sensing layer 1200, so that the force sensing layer 1500 and an electrode of the display unit 1300 may constitute the force sensing capacitor Cf.

A capacitance value of a capacitor consisting of two electrodes can be calculated by Equation 1 mentioned above. Referring to Equation 1, the capacitance value increases as the distance between the two electrodes is reduced, and decreases as the areas of the electrodes are reduced. Therefore, it is possible to reduce the area of an electrode by forming the force sensing layer 1500 to have a porous structure, and accordingly, the capacitance value of the force sensing capacitor Cf can be reduced. Also, when an object provides a force input and the cover window 1100 approaches the body 1400a or 1400b, the distance between the two electrodes is reduced, and the capacitance value of the force sensing capacitor Cf increases.

The switching unit 2000 is electrically connected to the force sensing capacitor Cf, and includes a plurality of switches S1a, S1b, S2, S3, S4, and S5 and the compensation capacitor Cc. The plurality of switches S1a, S1b, S2, S3, S4, and S5 are controlled by signals provided by the controller 4000, and may be implemented as semiconductor switches such as FETs, BJTs, or so on. On and off of the switches S1a and S1b is controlled by an identical control signal S1. As will be described below, the compensation capacitor Cc compensates for the capacitance of the force sensing capacitor Cf through two charge sharing processes, thereby facilitating detection of an influence of an increase ΔCf in the capacitance of the force sensing capacitor Cf caused by a force input.

A first power supply voltage Vdd1 provided to the switching unit 2000 is obtained by multiplying a second supply voltage provided to the detection circuit 3000, etc., that is, by stepping up the second supply voltage supplied to a chip with a charge pump (not shown) or a voltage multiplier (not shown). By supplying the first supply voltage Vdd1 to the force sensing capacitor Cf, it is possible to increase the amount of charges stored in the force sensing capacitor Cf, thereby improving the performance of detecting a force input. One electrode and the other electrode of the compensation capacitor Cc are connected to nodes n1 and n2, respectively. As will be described below, the compensation capacitor Cc performs a function of compensating for the capacitance of the force sensing capacitor Cf.

Although not shown in the drawings, the switching unit 2000, the detection circuit 3000, and the controller 4000 may be formed according to channels of sensing electrodes included in an apparatus for detecting a touch input. Also, each of the nodes n1 and the nodes n2 of the switching units 2000 formed according to the channels may be electrically connected to switches controlled by the controllers 4000 and may electrically connect compensation capacitors included in the switching units 2000. As will be described below, compensation capacitors of several channels may be connected in parallel to form a compensation capacitor having a larger equivalent capacitance than each of the compensation capacitors.

Figure 11:
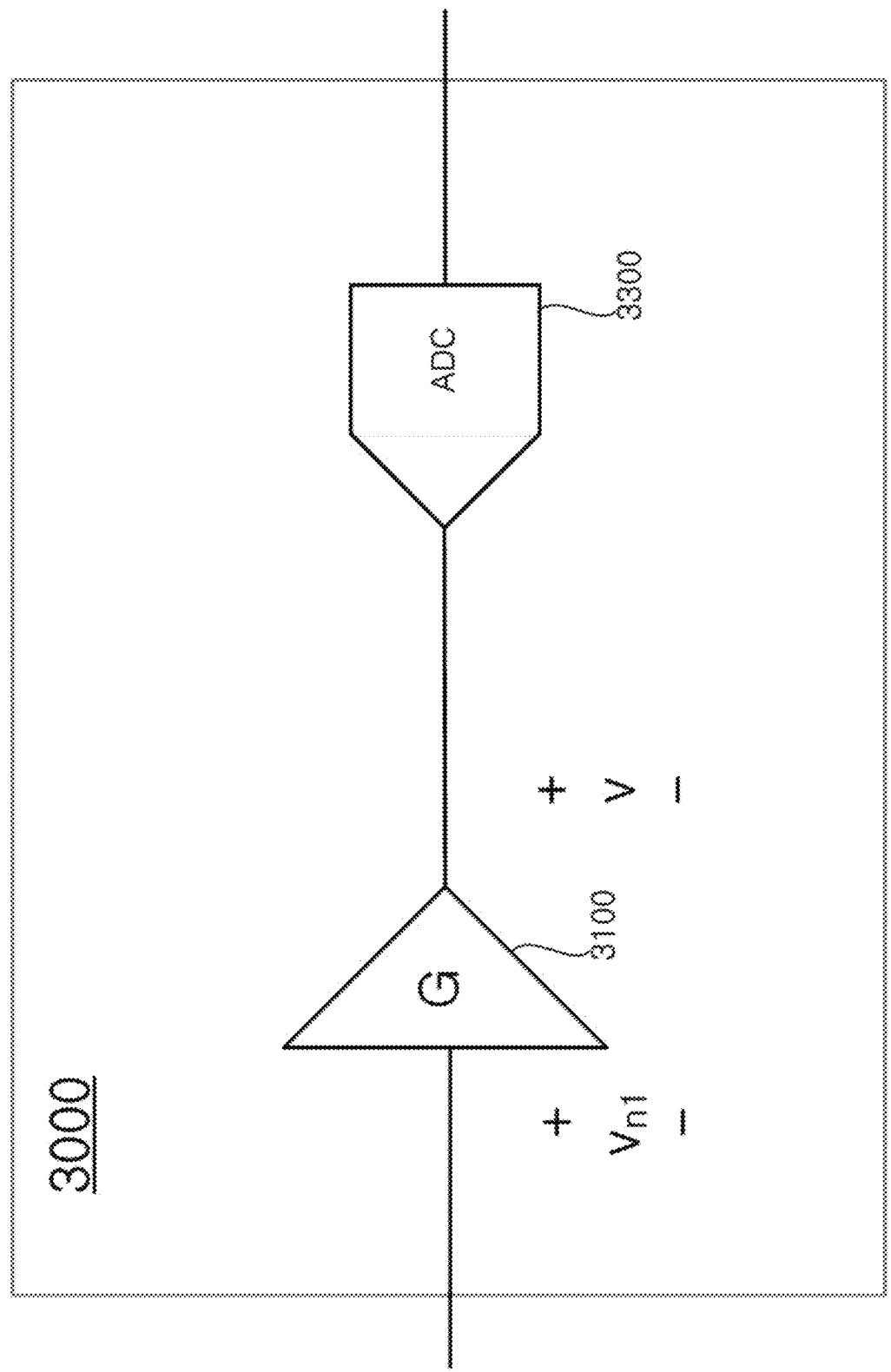
FIG. 11 is a diagram showing an exemplary embodiment of the detection circuit 3000.

FIG. 11 is a diagram showing an exemplary embodiment of the detection circuit 3000. The detection circuit 3000 includes an amplifier 3100 which receives and amplifies an electrical signal $V_{n1}$. The capacitance value of the force sensing capacitor Cf changes according to a force input provided by the object O. The amplifier 3100 is provided with the electrical signal $V_{n1}$ generated due to the change ΔCf in the capacitance value and generates an output signal V by amplifying the electrical signal $V_{n1}$.

The amplifier 3100 amplifies the input signal with a preset gain. Any amplifier which can be provided with an electrical signal and amplify and output the electrical signal can be employed in the apparatus for detecting a force input according to the exemplary embodiment regardless of its shape and constitution. As an example, the amplifier 3100 may be a single-ended amplifier, and as another example, the amplifier 3100 may be a differential amplifier which amplifies a difference between a predetermined voltage or the ground voltage and the electrical signal.

According to an exemplary embodiment, the detection circuit 3000 may also include an ADC 3300. The ADC 3300 may convert a signal provided by the amplifier 3100 into a digital signal and provide the digital signal to a digital signal processor for follow-up signal processing.

In an exemplary embodiment, the detection circuit 3000 operates with a provided second supply voltage Vdd2 different from the first supply voltage Vdd1 of the switching unit 2000. The detection circuit 3000 may include an ADC and so on. When the ADC, etc. is formed to operate at the first supply voltage Vdd1 obtained by multiplying the second supply voltage Vdd2, a required die area increases, which is uneconomical. Therefore, to reduce an area required to implement a function, the detection circuit 3000 is implemented to operate at the second supply voltage Vdd2 which is lower than the first supply voltage Vdd1. In another example, for a simple circuit design, it is also possible to design the detection circuit 3000 to operate at the first supply voltage Vdd1.

Figure 12A:
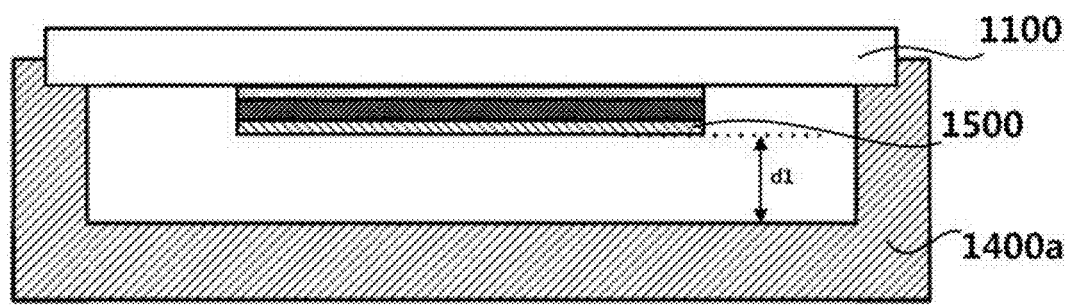
FIG. 12A is a diagram showing a state in which no force input is provided to the exemplary embodiment shown.
Figure 12B:
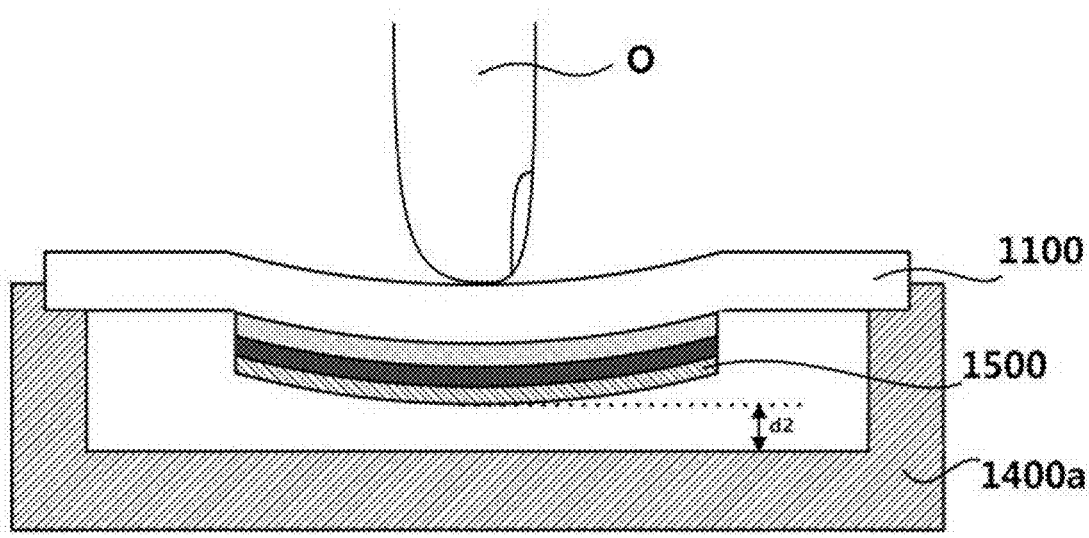
FIG. 12B is a diagram showing a state of the force sensing layer and the metal body when a force input is provided.

A method of compensating a force sensing capacitor and an operation of the apparatus for detecting a force input using the method will be described below with reference to FIGS. 12(A) and 12(B) to FIG. 16. FIG. 12(A) is a diagram showing a state in which no force input is provided to the exemplary embodiment shown in FIG. 8(A) and the force sensing layer 1500 which is one electrode of the force sensing capacitor Cf and the metal body 1400a are spaced apart from each other, and FIG. 12(B) is a diagram showing a state of the force sensing layer 1500 and the metal body 1400a when a force input is provided. As shown in FIG. 12(A), before a force input is provided, the distance between the force sensing layer 1500 and the metal body 1400a is d1. When the object O provides a force input, the cover window 1100 is deformed as shown in FIG. 12(B) by way of example, and accordingly, the force sensing layer 1500 is also deformed. As the force sensing layer 1500 approaches the metal body 1400a, the distance is reduced to d2, and the average distance between the force sensing layer 1500 and the metal body 1400a is also reduced. The reduction in the distance between the one electrode and the other electrode of the force sensing capacitor Cf results in an increase in the capacitance of the force sensing capacitor Cf (see Equation 1).

As a force input is provided to the exemplary embodiment shown in FIG. 8(B), the force sensing layer 1500 which is an electrode of the force sensing capacitor Cf approaches the reference electrode of the display unit 1300 which is the other electrode of the force sensing capacitor Cf, and thus the capacitance of the force sensing capacitor Cf increases. Also, according to an exemplary embodiment not shown in the drawings, as a force input is provided, the display unit 1300 including the other electrode of the force sensing capacitor Cf approaches the force sensing layer 1500 which is the one electrode of the force sensing capacitor Cf, and thus the capacitance of the force sensing capacitor Cf increases.

When the increase in the capacitance of the force sensing capacitor Cf caused by the force input is indicated as ΔCf, an equivalent capacitance electrically connected to the switching unit 2000 becomes Cf+ΔCf which is the sum of the capacitance of the force sensing capacitor Cf and the increase ΔCf in the capacitance of the force sensing capacitor Cf. Therefore, an equivalent capacitance connected to the switching unit 2000 is Cf when no force input is provided, and an equivalent capacitance connected to the switching unit 2000 is Cf+ΔCf when a force input is provided.

Since the capacitance of the force sensing capacitor Cf is large compared to the increase ΔCf in the capacitance, it is difficult to detect the capacitance change ΔCf within an effective range using an apparatus for detecting a force input according to related art. According to an exemplary embodiment, it is possible to compensate for the capacitance of a force sensing capacitor through the following process.

Figure 13:
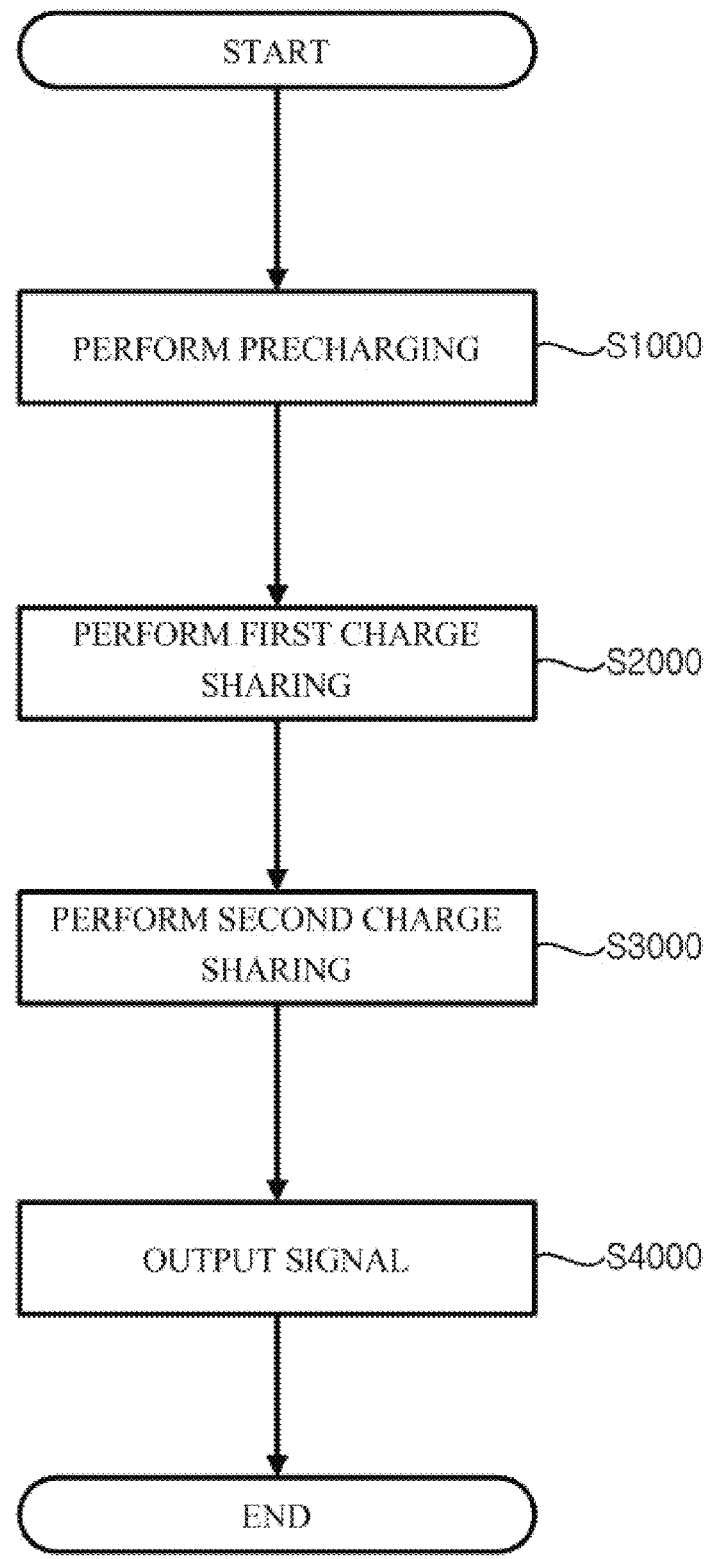
FIG. 13 is a flowchart schematically showing each operation of a method of compensating for a force sensing capacitance.

FIG. 13 is a flowchart schematically showing each operation of a method of compensating for a force sensing capacitance according to an exemplary embodiment. Referring to FIG. 13, the method of compensating for a force sensing capacitance according to the exemplary embodiment includes an operation of precharging a force sensing capacitor and a compensation capacitor with a supply voltage (S1000), an operation of performing first charge sharing by connecting the force sensing capacitor and the compensation capacitor in series between the supply voltage and a reference voltage (S2000), an operation of performing second charge sharing so that the force sensing capacitor and the compensation capacitor have an identical voltage (S3000), and an operation of outputting a voltage generated through the second charge sharing (S4000).

Figure 14:
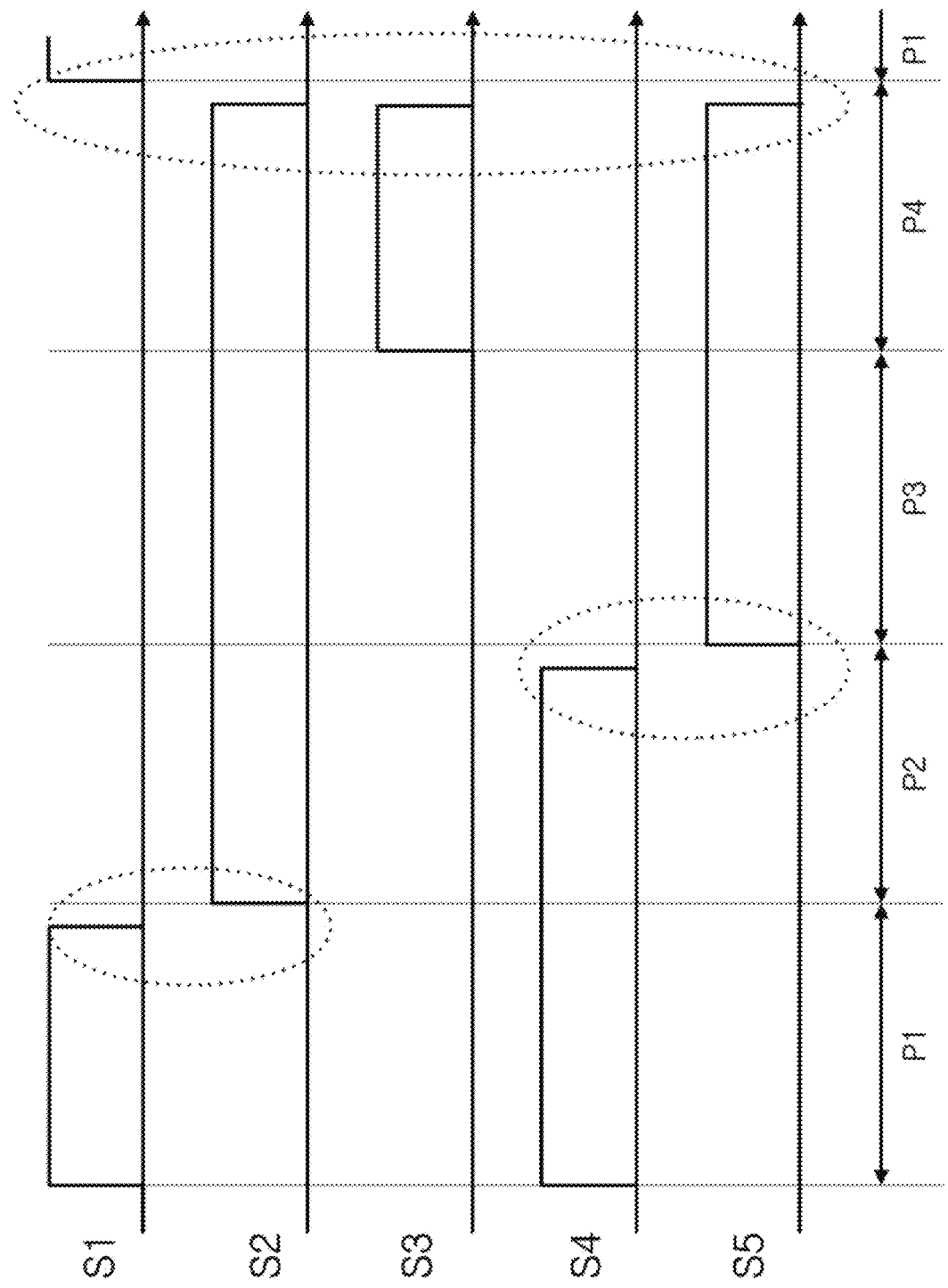
FIG. 14 is an example of a timing diagram of control signals provided to the switching unit by the controller.

FIG. 14 is an example of a timing diagram of control signals provided to the switching unit 2000 by the controller 4000. Referring to FIG. 14, the controller 4000 drives the switching unit 2000 in a precharge phase P1, a first charge sharing phase P2, a second charge sharing phase P3, and an output phase P4. In an exemplary embodiment, the controller 4000 may drive again the switching unit 2000 in the precharge phase P1 after the output phase P4.

Referring to portions indicated by dotted lines, the controller 4000 generates control signals so that the control signals do not overlap each other at each boundary of the phases to prevent charges stored in each capacitor from being unintentionally discharged or shared in a switch conduction and blocking process.

In the example shown in FIG. 14, the switches included in the switching unit 2000 are implemented as NMOS switches. Therefore, when a signal in the HIGH state is provided to a control electrode of each switch, the switch becomes conductive, and when a signal in the LOW state is provided, the switch is blocked. However, this is merely an example, and the switches can also be implemented as PMOS switches which become conductive when a signal in the LOW state is provided and are blocked when a signal in the HIGH state is provided or as NPN BJTs or PNP BJTs which are controlled to be conductive or blocked when a positive or negative current is provided to their bases.

Figure 15:
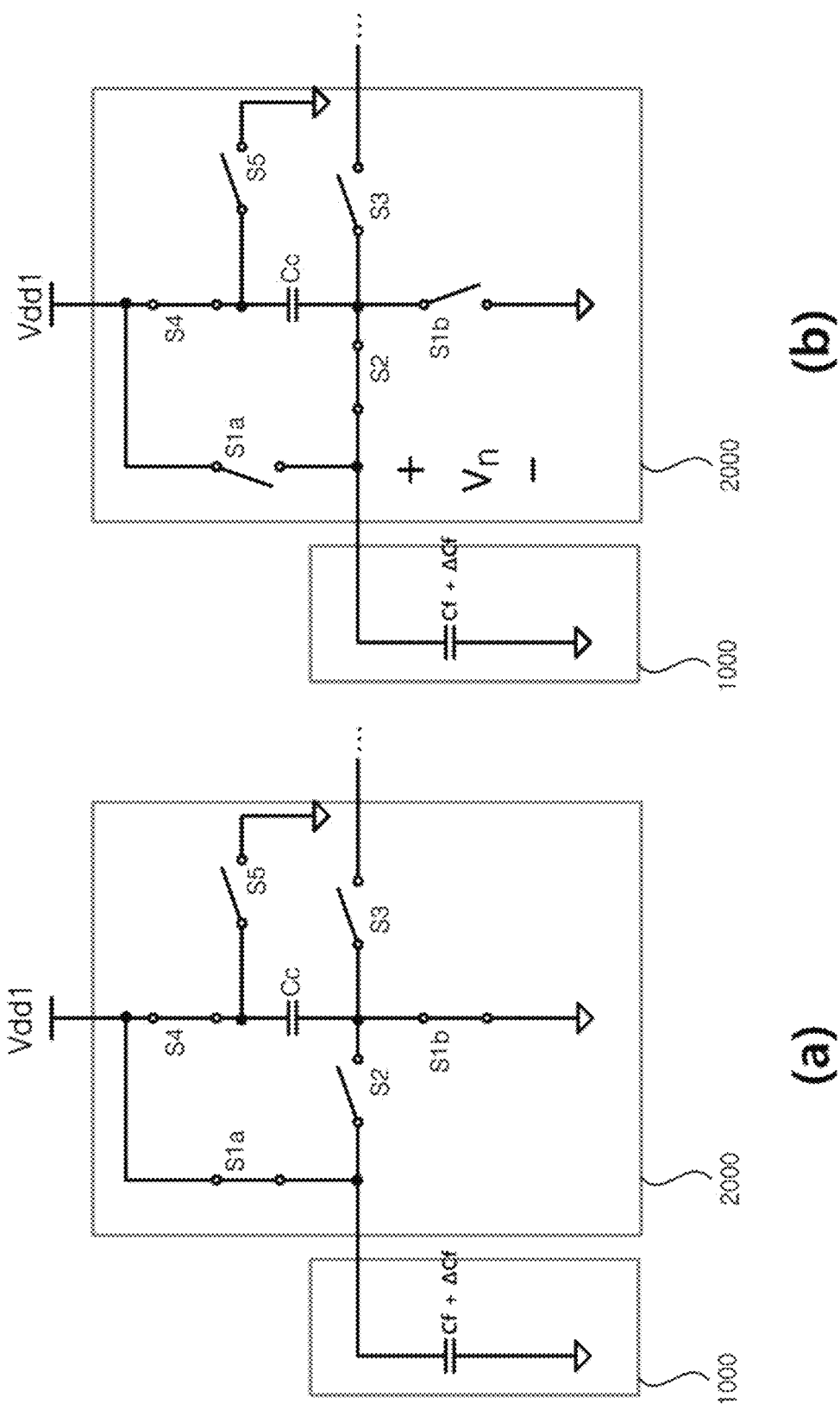
FIGS. 15 and 16 are diagrams showing equivalent circuits according to phase in which a controller controls a switching unit.
Figure 16:
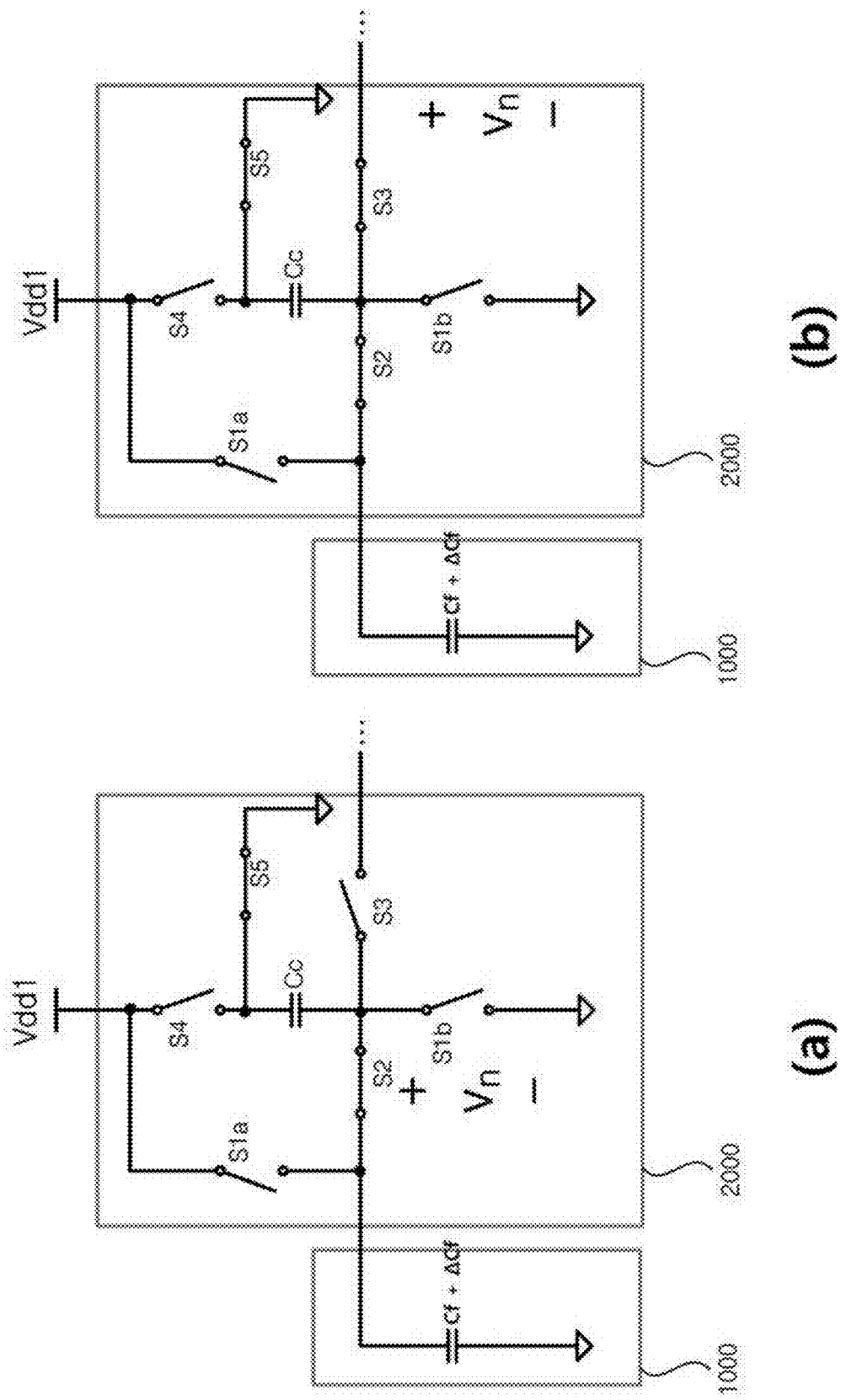

FIGS. 15 and 16 are diagrams showing equivalent circuits according to phase in which the controller 4000 controls the switching unit 2000. FIG. 15(A) shows an equivalent circuit corresponding to a case in which the switching unit 2000 is driven in the precharge phase P1. Referring to FIGS. 13 to 15(A), in the precharge phase P1 of FIG. 14, the switches S1a, S1b, and S4 of the switching unit 2000 are controlled to be turned on, and the other switches are controlled to be turned off. Therefore, the switching unit 2000 and a touch panel 1000 form an equivalent circuit of FIG. 15(A), and the force sensing capacitor Cf having the increase ΔCf in the capacitance and the compensation capacitor Cc are both charged with the first supply voltage Vdd1 in the precharge phase P1 (S1000). In the equivalent circuit, the compensation capacitor Cc and the force sensing capacitor Cf having the increase ΔCf in the capacitance are connected in parallel. One node of the compensation capacitor Cc and one node of the force sensing capacitor Cf having the increase ΔCf in the capacitance are provided with the first supply voltage Vdd1, and the other node of the compensation capacitor Cc and the other node of the force sensing capacitor Cf having the increase ΔCf in the capacitance are connected to the ground voltage. Therefore, the compensation capacitor Cc and the force sensing capacitor Cf are both charged to the first supply voltage Vdd1.

FIG. 15(B) shows an equivalent circuit corresponding to a case in which the switching unit 2000 is driven in the first charge sharing phase P2. Referring to FIGS. 13, 14, and 15(B), in the first charge sharing phase P2, the switches S2 and S4 are controlled to be conductive, and the other switches are controlled to be blocked. In the equivalent circuit, the compensation capacitor Cc and the force sensing capacitor Cf having the increase ΔCf in the capacitance are connected in series between the first supply voltage Vdd1 and the ground voltage. Charges stored in the compensation capacitor Cc and the force sensing capacitor Cf having the increase ΔCf in the capacitance in the precharge phase P1 are distributed in the first charge sharing phase P2 (S2000). A voltage Vn formed at the force sensing capacitor Cf having the increase ΔCf in the capacitance due to the charge distribution in the first charge sharing phase P2 is as shown in ① of Equation 4.

[Equation 4]

$$V_n = V_{dd1} \frac{C_f + \Delta C_f}{C_c + C_f + \Delta C_f} \quad ①$$

$$\approx V_{dd1} \frac{C_f}{C_c + C_f} \quad ②$$

Since the increase ΔCf in the capacitance of the force sensing capacitor Cf is so smaller than Cf+Cc, which is the sum of the capacitances of the force sensing capacitor Cf and the compensation capacitor Cc, that the increase ΔCf in the capacitance of the force sensing capacitor Cf can be ignored. Therefore, ① can be approximated to ②. For example, when the second supply voltage Vdd2 provided to the amplifier 3100 is 2 V, the first supply voltage Vdd1 is 9 V, and the capacitance of the force sensing capacitor Cf is 100 pF, the capacitance of the compensation capacitor Cc should be 800 pF so that the voltage Vn becomes 1 V which is half the second supply voltage Vdd2. However, a large die size is required to obtain the capacitance of 800 pF in a chip, which is uneconomical.

FIG. 16(A) shows an equivalent circuit corresponding to a case in which the switching unit 2000 is driven in the second charge sharing phase P3. Referring to FIGS. 13, 14, and 16(A), in the second charge sharing phase P3, the switches S2 and S5 are controlled to be conductive, and the other switches are controlled to be blocked (S3000). In the second charge sharing phase P3, charges stored in the compensation capacitor Cc and the force sensing capacitor Cf having the increase ΔCf in the capacitance in the first charge sharing phase P2 are distributed again (S3000). The voltage Vn formed at the equivalent parallel capacitor Cf+Cc in the second charge sharing phase P3 is as shown in Equation 5.

[Equation 5]

$$V_{n1} = V_{dd1} \frac{C_f + \Delta C_f - C_c}{C_f + \Delta C_f + C_c} \quad ①$$

$$\approx V_{dd1} \frac{C_f - C_c}{C_f + C_c} \quad ②$$

In ① of Equation 5, the increase ΔCf in the capacitance of the force sensing capacitor Cf is so smaller than Cf+Cc, which is the sum of the capacitances of the force sensing capacitor Cf and the compensation capacitor Cc, that the increase ΔCf in the capacitance of the force sensing capacitor Cf can be ignored. Therefore, ① can be approximated to ②. When the capacitance of the force sensing capacitor Cf is 100 pF and the output voltage Vn is intended to be 1 V which is half the second supply voltage Vdd2 like in the first charge sharing phase P2, a capacitor having a capacitance of 80 pF, which is only about 10% of the capacitance value obtained in the previous phase, is calculated by ② of Equation 5 to be required as the compensation capacitor Cc for compensating the force sensing capacitor Cf. In an exemplary embodiment, it is possible to adjust the output voltage Vn of the switching unit 2000 to a specific voltage value by adjusting the capacitance of the compensation capacitor Cc as described above.

In an exemplary embodiment, the switching unit 2000, the detection circuit 3000, and the controller 4000 included in the apparatus for detecting a force input according to the exemplary embodiment may be formed according to channels of sensing electrodes included in an apparatus for detecting a touch input, and may detect an object hovering over a touch panel. When a capacitance value obtained by calculating ② of Equation 5 is too large to be implemented in a chip, the controller 4000 controls switches (not shown) to connect compensation capacitors included in switching units formed according to channels in parallel to each other. Therefore, it is possible to form a compensation capacitor having a larger equivalent capacitance value than the capacitance of each compensation capacitor formed according to channel. Also, by adjusting the number of capacitors connected in parallel according to a calculation result of ② of Equation 5, it is possible to actively control the capacitance of an equivalent compensation capacitor.

The apparatus for detecting a force input according to the exemplary embodiment may be fixedly located in any one place, or may be installed in a cellular phone, a tablet PC, a laptop computer, etc. and thus the location may be changed. In the former case as well as the latter case, a capacitance value may increase or decrease due to a change in ambient temperature, humidity, and so on. The change in the capacitance value may lead to a degradation of the performance of detecting a force input. However, according to the exemplary embodiment, it is possible to improve the performance of detecting a force input by actively coping with the capacitance which changes depending on surroundings and the location of the apparatus for detecting a force input.

Also, the apparatus for detecting a force input according to the exemplary embodiment can compensate the force sensing capacitor Cf through a precharge phase and two charge sharing phases. Therefore, it is possible to detect a force input with higher accuracy and sensitivity.

According to an exemplary embodiment, it is possible to overcome a parasitic capacitance and effectively detect a hovering object which does not come in touch with a touch panel.

Also, according to an exemplary embodiment, it is possible to reduce an influence of a parasitic capacitance and detect a hovering object with high accuracy regardless of a change in the parasitic capacitance caused by a change in surroundings of an apparatus for detecting a hovering object.

Further, according to an exemplary embodiment, it is possible to detect a force input with higher accuracy and sensitivity than those of related art by compensating for a capacitance value of a capacitor intrinsically inherent in an apparatus for detecting a force input.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of detecting a hovering object, the method comprising:
an operation of precharging a compensation capacitor and a parallel capacitor, which is obtained by connecting in parallel a self-capacitor formed between an object hovering over a touch panel and an electrode of the touch panel and a parasitic capacitor of the touch panel, with a predetermined voltage;
a first charge sharing operation of sharing charges by connecting the parallel capacitor and the compensation capacitor in series;
a second charge sharing operation of sharing charges by connecting the parallel capacitor and the compensation capacitor in parallel; and
an operation of outputting an electrical signal provided by the parallel capacitor while the parallel capacitor and the compensation capacitor are connected in parallel,
wherein the operation of precharging the compensation capacitor and the parallel capacitor is performed by one electrode of the compensation capacitor connected to a supply voltage and one terminal of the parallel capacitor connected to the supply voltage so that the compensation capacitor and the parallel capacitor are precharged with the supply voltage.

2. The method of claim 1, wherein the first charge sharing operation includes:
providing the predetermined voltage to one end of the compensation capacitor;
electrically connecting another end of the compensation capacitor and one end of the parallel capacitor; and
providing a ground voltage to another end of the parallel capacitor.

3. The method of claim 1, wherein the second charge sharing operation includes:
providing a ground voltage to one end of the compensation capacitor;
electrically connecting another end of the compensation capacitor and one end of the parallel capacitor; and
providing the ground voltage to another end of the parallel capacitor.

4. The method of claim 1, wherein a capacitance value of the compensation capacitor is set so that the electrical signal provided by the parallel capacitor becomes an intended level.

5. The method of claim 1, wherein a capacitance value of the compensation capacitor changes according to a change in a capacitance value of the parasitic capacitor.

6. The method of claim 1, wherein
the operation of outputting the electrical signal includes providing the electrical signal to a detection circuit, and
the detection circuit is provided with the electrical signal, amplifies the electrical signal with a preset gain, integrates the amplified signal, and converts the integrated signal into a digital signal.

7. An apparatus for detecting a hovering object, the apparatus comprising:
a touch panel configured to include an electrode constituting a self-capacitor together with a hovering object and having a parasitic capacitor;
a switching unit configured to include a compensation capacitor for compensating the parasitic capacitor and connect the compensation capacitor and a parallel capacitor obtained by connecting in parallel the self-capacitor and the parasitic capacitor in parallel or series; and
a detection circuit configured to detect an electrical signal changing according to whether the hovering object approaches,
wherein the switching unit precharges the parallel capacitor and the compensation capacitor, performs first charge sharing by connecting the parallel capacitor and the compensation capacitor in series, performs second charge sharing by connecting the parallel capacitor and the compensation capacitor in parallel, receives the electrical signal from the self-capacitor, and provides the electrical signal to the detection circuit,
wherein the parallel capacitor and the compensation capacitor are precharged by connecting one electrode of the compensation capacitor to a supply voltage and connecting one terminal of the parallel capacitor to the supply voltage so that the compensation capacitor and the parallel capacitor are precharged with the supply voltage.

8. The apparatus of claim 7, wherein the switching unit performs the precharging by separately charging the parallel capacitor and the compensation capacitor with the supply voltage.

9. The apparatus of claim 7, wherein the switching unit performs the first charge sharing by connecting the supply voltage to one end of the compensation capacitor, electrically connecting another end of the compensation capacitor and one end of the parallel capacitor, and connecting a ground voltage to another end of the parallel capacitor.

10. The apparatus of claim 7, wherein the switching unit performs the second charge sharing by connecting a ground voltage to one end of the compensation capacitor, electrically connecting another end of the compensation capacitor and one end of the parallel capacitor, and providing the ground voltage to another end of the parallel capacitor.

11. The apparatus of claim 7, wherein the compensation capacitor is controlled so that a voltage of the parallel capacitor is within an intended range during the second charge sharing.

12. The apparatus of claim 7, wherein a capacitance of the compensation capacitor changes according to a change in a capacitance of the parasitic capacitor.

13. The apparatus of claim 7, wherein the detection circuit includes:
   an amplifier configured to amplify the electrical signal provided by the self-capacitor and output the amplified signal;
   an integrator configured to integrate the amplified signal; and
   an analog-to-digital converter (ADC) configured to convert the integrated signal into a digital signal.

14. A switching matrix provided with a power supply voltage and a first reference voltage, the switching matrix comprising:
   a plurality of switches;
   a node electrically connected to an input and an output;
   a first capacitor having one end connected to the node and another end connected to a ground voltage;
   a second capacitor connected to the node; and
   a controller configured to control the plurality of switches,
   wherein the controller controls the plurality of switches in a first phase so that the power supply voltage is separately provided to the first capacitor and the second capacitor, controls the plurality of switches in a second phase so that the power supply voltage, the second capacitor, and the first capacitor are connected in series, and controls the plurality of switches in a third phase so that the first capacitor and the second capacitor are connected in parallel,
   wherein the controller further controls the plurality of switches in the first phase such that one electrode of the second capacitor is connected to the power supply voltage and one terminal of the first capacitor is connected to the power supply voltage so that the second capacitor and the first capacitor are precharged with the power supply voltage.

15. The switching matrix of claim 14, further comprising:
   an output switch configured to connect the output and an external circuit or disconnect the output and the external circuit from each other,
   wherein, after the third phase, the controller controls the plurality of switches in a fourth phase so that the output switch is turned on while the first capacitor and the second capacitor are connected in parallel.

16. The switching matrix of claim 15, wherein the controller performs control so that the output switch is turned off in the first to third phases and the first capacitor transfers an electrical signal to the output in the fourth phase.

17. An apparatus for determining a compensation capacitance, the apparatus comprising:
   a touch panel configured to include an electrode constituting a self-capacitor;
   a switching unit configured to include a compensation capacitor for compensating a parasitic capacitor and connect the self-capacitor, the parasitic capacitor, and the compensation capacitor in parallel or series;
   a compensation circuit configured to determine a capacitance of the compensation capacitor, and including a capacitor array including a plurality of capacitors, a plurality of switches, and a controller configured to control an equivalent capacitance of the capacitor array by controlling the plurality of switches; and
   a detection circuit configured to generate an electrical signal according to a change of the equivalent capacitance,
   wherein the controller determines as the compensation capacitor a capacitor having an equivalent capacitance causing the electrical signal according to a change of the equivalent capacitance to be within a predetermined range,
   wherein each capacitor of the plurality of capacitors and each switch of the plurality of switches form a plurality of series branches, and
   wherein the plurality of series branches are connected in parallel.

18. The apparatus of claim 17, wherein each capacitor of the plurality of capacitors has one end connected to a first common node and another end connected to a second common node through one switch of the plurality of switches.

19. The apparatus of claim 17, wherein the predetermined range includes an intermediate level between a supply voltage provided to the detection circuit and a ground voltage.

20. The apparatus of claim 17, wherein the compensation capacitor is determined again when surroundings of the apparatus change or when a predetermined time elapses after the determination of the compensation capacitor.

21. A method of compensating for a force sensing capacitance, the method comprising:
   precharging a force sensing capacitor and a compensation capacitor with a supply voltage;
   performing first charge sharing by connecting the force sensing capacitor and the compensation capacitor in series between the supply voltage and a reference voltage;
   performing second charge sharing so that the force sensing capacitor and the compensation capacitor have an identical voltage; and
   outputting a voltage generated through the second charge sharing,
   wherein the precharging the force sensing capacitor and the compensation capacitor with the supply voltage includes connecting one electrode of the force sensing capacitor to the supply voltage and connecting one electrode of the compensation capacitor to the supply voltage so that the force sensing capacitor and the compensation capacitor are precharged with the supply voltage.

22. The method of claim 21, wherein the force sensing capacitor has a force sensing layer, which is a conductive pattern having a porous structure, as one electrode.

23. The method of claim 22, wherein holes in a central area of the porous structure have larger areas than holes in a peripheral area of the porous structure.

24. The method of claim 21, wherein the compensation capacitor is formed by connecting a plurality of capacitors in parallel.

25. The method of claim 21, wherein the performing the second charge sharing includes connecting the force sensing capacitor and the compensation capacitor in parallel, so that nodes connected to the force sensing capacitor and the compensation capacitor have an identical voltage.

26. The method of claim 21, wherein a capacitance value of the compensation capacitor is set so that the precharged voltage becomes an intended level.

27. The method of claim 21, wherein
the outputting includes providing the generated voltage to a detection circuit, and
the detection circuit is provided with the generated voltage, amplifies the generated voltage with a preset gain, and converts a signal of the amplified voltage into a digital signal.

28. An apparatus for detecting a force input, the apparatus comprising:
a cover window configured to be deformed by a force input provided by an object;
a force sensing layer which is one electrode of a force sensing capacitor whose capacitance value changes according to the deformation of the cover window; and
a force input detector configured to detect the force input, wherein the force input detector includes:
a compensation capacitor configured to compensate the force sensing capacitor;
a switching unit configured to switch an electrical connection between the force sensing capacitor and the compensation capacitor; and
a detection circuit configured to detect an electrical signal changing according to a change in the capacitance value of the force sensing capacitor,
wherein the electrical connection switching of the force sensing capacitor and the compensation capacitor performed by the switching unit comprises:
connecting one terminal of the compensation capacitor to a supply voltage and connecting one terminal of the force sensing capacitor to the supply voltage so that the compensation capacitor and the force sensing capacitor are precharged with the supply voltage;
connecting the force sensing capacitor and the compensation capacitor in series in order to share charges between the force sensing capacitor and the compensation capacitor;
connecting the force sensing capacitor and the compensation capacitor in parallel to obtain a parallel capacitor in order to share charges between the force sensing capacitor and the compensation capacitor; and
outputting an electrical signal provided by the parallel capacitor while the parallel capacitor and the compensation capacitor are connected in parallel.

29. The apparatus of claim 28, further comprising:
a metal body,
wherein another electrode of the force sensing capacitor is the metal body.

30. The apparatus of claim 28, further comprising:
a display unit configured to display an image,
wherein another electrode of the force sensing capacitor is included in the display unit.

31. The apparatus of claim 28, wherein the force sensing layer is a conductive pattern having a porous structure.

32. The apparatus of claim 31, wherein holes in a central area of the porous structure have larger areas than holes in a peripheral area of the porous structure.

33. The apparatus of claim 28, wherein the switching unit is switched so that the electrical signal provided by the parallel capacitor is provided to the detection circuit.

34. The apparatus of claim 28, wherein the detection circuit includes:
an amplifier configured to amplify the electrical signal and output the amplified signal; and
an analog-to-digital converter (ADC) configured to convert the amplified signal into a digital signal.

35. A method of compensating a capacitance of a parasitic capacitor of a touch panel, the method comprising:
an operation of precharging a compensation capacitor and a parallel capacitor with a predetermined voltage, the parallel capacitor comprises the parasitic capacitor of the touch panel and a self-capacitor formed between an object and an electrode of the touch panel connected in parallel;
a first charge sharing operation of sharing charges by connecting the parallel capacitor and the compensation capacitor in series;
a second charge sharing operation of sharing charges by connecting the parallel capacitor and the compensation capacitor in parallel; and
an operation of outputting an electrical signal provided by the parallel capacitor while the parallel capacitor and the compensation capacitor are connected in parallel,
wherein the operation of precharging the compensation capacitor and the parallel capacitor is performed by one electrode of the compensation capacitor connected to a supply voltage and one terminal of the parallel capacitor connected to the supply voltage so that the compensation capacitor and the parallel capacitor are precharged with the supply voltage.

36. The method of claim 35, wherein
the operation of outputting the electrical signal includes providing the electrical signal to a detection circuit, and
the detection circuit is provided with the electrical signal, amplifies the electrical signal with a preset gain, integrates the amplified signal, and converts the integrated signal into a digital signal.

37. The method of claim 35, wherein the first charge sharing operation includes:
providing the predetermined voltage to one end of the compensation capacitor;
electrically connecting another end of the compensation capacitor and one end of the parallel capacitor; and
providing a ground voltage to another end of the parallel capacitor.

38. The method of claim 35, wherein the second charge sharing operation includes:
providing a ground voltage to one end of the compensation capacitor;
electrically connecting another end of the compensation capacitor and one end of the parallel capacitor; and
providing the ground voltage to another end of the parallel capacitor.

39. The method of claim 35, wherein a capacitance value of the compensation capacitor is set so that the electrical signal provided by the parallel capacitor becomes an intended level.

40. The method of claim 35, wherein a capacitance value of the compensation capacitor is set according to a capacitance value of the parasitic capacitor.

41. An apparatus for compensation of a capacitance of a parasitic capacitor, the apparatus comprising:
   a touch panel comprising the parasitic capacitor and an electrode configured to form a self-capacitor together with an object; and
   a switching unit comprising a compensation capacitor for compensating the parasitic capacitor,
   wherein the switching unit connects the compensation capacitor and a parallel capacitor in series or in parallel,
   wherein the parallel capacitor comprises the parasitic capacitor and the self-capacitor connected in parallel,
   wherein the switching unit precharges the parallel capacitor and the compensation capacitor, performs first charge sharing by connecting the parallel capacitor and the compensation capacitor in series, and performs second charge sharing by connecting the parallel capacitor and the compensation capacitor in parallel, and
   wherein the parallel capacitor and the compensation capacitor are precharged by connecting one electrode of the compensation capacitor to a supply voltage and connecting one terminal of the parallel capacitor to the supply voltage so that the compensation capacitor and the parallel capacitor are precharged with the supply voltage.

42. The apparatus of claim 41, wherein the switching unit performs the precharging by separately charging the parallel capacitor and the compensation capacitor with the supply voltage.

43. The apparatus of claim 41, wherein the switching unit performs the first charge sharing by connecting the supply voltage to one end of the compensation capacitor, electrically connecting another end of the compensation capacitor and one end of the parallel capacitor, and connecting a ground voltage to another end of the parallel capacitor.

44. The apparatus of claim 41, wherein the switching unit performs the second charge sharing by connecting a ground voltage to one end of the compensation capacitor, electrically connecting another end of the compensation capacitor and one end of the parallel capacitor, and providing the ground voltage to another end of the parallel capacitor.

45. The apparatus of claim 41, wherein a capacitance of the compensation capacitor is set so that a voltage of the parallel capacitor is within an intended range during the second charge sharing.

46. The apparatus of claim 41, wherein the apparatus further comprises:
   a detection circuit,
   wherein the detection circuit includes:
      an amplifier configured to amplify an electrical signal provided by the self-capacitor and output the amplified signal;
      an integrator configured to integrate the amplified signal; and
      an analog-to-digital converter (ADC) configured to convert the integrated signal into a digital signal.

* * * * *